United States Patent
Gao et al.

(10) Patent No.: US 12,225,177 B2
(45) Date of Patent: Feb. 11, 2025

(54) SCREEN DETECTION METHOD, APPARATUS AND DEVICE, COMPUTER PROGRAM AND READABLE MEDIUM

(71) Applicant: BOE Technology Group Co., Ltd., Beijing (CN)

(72) Inventors: Jian Gao, Beijing (CN); Sen Ma, Beijing (CN); Fang Cheng, Beijing (CN); Tao Hong, Beijing (CN); Jinye Zhu, Beijing (CN); Pengxia Liang, Beijing (CN); Jing Yu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 5 days.

(21) Appl. No.: 17/765,390

(22) PCT Filed: May 28, 2021

(86) PCT No.: PCT/CN2021/096964
§ 371 (c)(1),
(2) Date: Mar. 30, 2022

(87) PCT Pub. No.: WO2022/246844
PCT Pub. Date: Dec. 1, 2022

(65) Prior Publication Data
US 2024/0121369 A1 Apr. 11, 2024

(51) Int. Cl.
*H04N 13/117* (2018.01)
*H04N 13/167* (2018.01)
*H04N 13/189* (2018.01)

(52) U.S. Cl.
CPC ......... *H04N 13/117* (2018.05); *H04N 13/167* (2018.05); *H04N 13/189* (2018.05)

(58) Field of Classification Search
CPC ............... H04N 13/117; H04N 13/167; H04N 13/189

(Continued)

(56) References Cited

U.S. PATENT DOCUMENTS 6,061,083 A * 5/2000 Aritake ............... H04N 13/117
348/E13.043
2006/0245063 A1 11/2006 Ra et al.
(Continued)

FOREIGN PATENT DOCUMENTS

CN 103105146 A 5/2013
CN 105807349 A 7/2016
(Continued)

OTHER PUBLICATIONS

The key technology of the three dimensionaldisplay with high resolution and dense viewpoints.
Research on Lenticular-lens Based Multi-view Auto-stereoscopic display Technology.
New Type Lenticular Lens for Auto-stereoscopic Display.

*Primary Examiner* — Stuart D Bennett
(74) *Attorney, Agent, or Firm* — IPro, PLLC

(57) ABSTRACT

The present disclosure provides a screen detection method, an apparatus and a device, a computer program and a readable medium, and belongs to the technical field of screens. The method includes: receiving a cylindrical lens detection instruction for a target screen, wherein the cylindrical lens detection instruction at least includes target viewpoints; acquiring browsing images shot from the target screen under the target viewpoints in response to the detection instruction, wherein the target screen is a screen of which the light emission side is provided with cylindrical lenses; using the browsing images as viewpoint images under the condition that the browsing images include target contents; and outputting detection parameters of the cylindrical lenses on the target screen based on image parameters of the viewpoint images.

15 Claims, 11 Drawing Sheets

(58) Field of Classification Search
USPC .......................................................... 348/51
See application file for complete search history.

(56) References Cited

U.S. PATENT DOCUMENTS

| | | | |
|---|---|---|---|
| 2011/0038043 A1 | 2/2011 | Lin et al. | |
| 2013/0176525 A1 | 7/2013 | Liao et al. | |
| 2014/0254008 A1* | 9/2014 | Tanioka | G02B 30/27 |
| | | | 359/464 |
| 2017/0261755 A1* | 9/2017 | Wang | G02F 1/133516 |
| 2018/0252932 A1 | 9/2018 | Tan et al. | |
| 2019/0394451 A1 | 12/2019 | Shin | |
| 2021/0112266 A1* | 4/2021 | Nakade | H04N 25/60 |
| 2021/0199984 A1* | 7/2021 | Park | G02B 3/005 |

FOREIGN PATENT DOCUMENTS

| | | |
|---|---|---|
| CN | 105892078 A | 8/2016 |
| CN | 107036790 A | 8/2017 |
| CN | 107655660 A | 2/2018 |
| CN | 108139591 A | 6/2018 |
| CN | 108966689 A | 12/2018 |
| CN | 110133781 A | 8/2019 |
| CN | 110262050 A | 9/2019 |
| CN | 212623379 U | 2/2021 |
| EP | 0788008 A1 | 8/1997 |
| KR | 20160017617 A | 2/2016 |
| KR | 20160080877 A | 7/2016 |

* cited by examiner

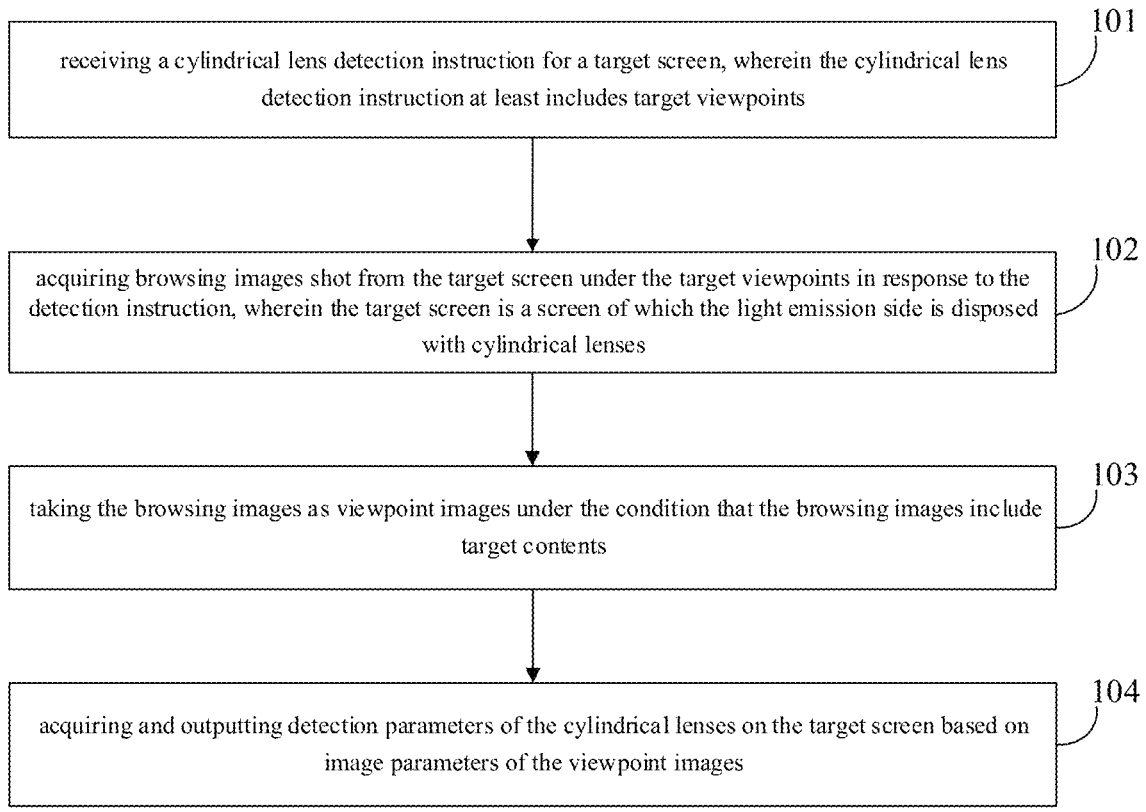

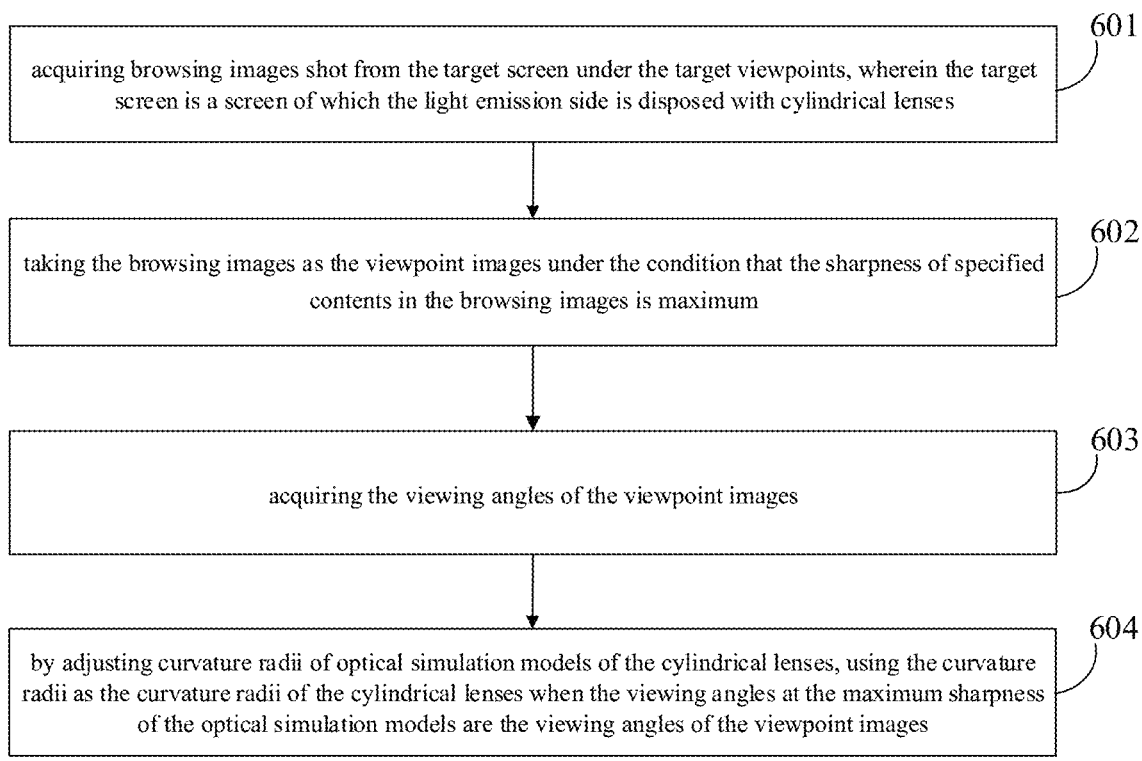
FIG. 14
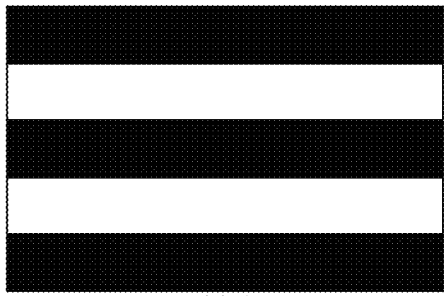
15-1
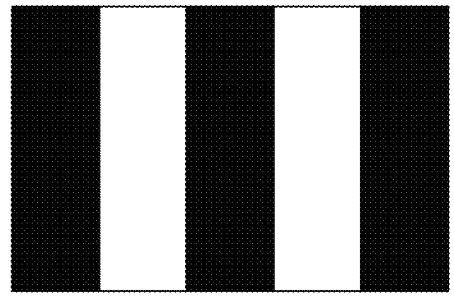
15-2
FIG. 15
Relatively little contrast of brightness and darkness at a non-aligned viewing angle (0°)
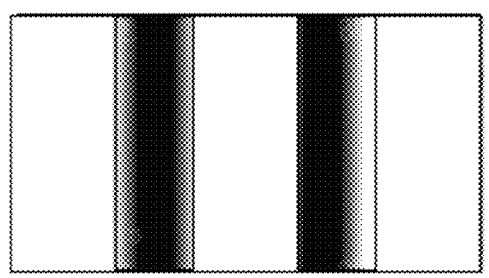
16-1
Relatively great contrast of brightness and darkness at an aligned viewing angle (21°)
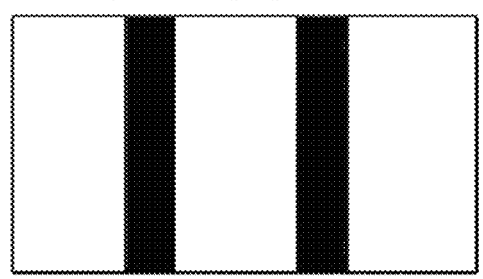
16-2
FIG. 16

SCREEN DETECTION METHOD, APPARATUS AND DEVICE, COMPUTER PROGRAM AND READABLE MEDIUM

TECHNICAL FIELD

The present disclosure belongs to the technical field of screens, in particular to a screen detection method, an apparatus and a device, a computer program and a readable medium.

BACKGROUND

Continuous motion parallax may be achieved by ultra-multi-viewpoint display which has a more realistic 3D display effect. The current method for achieving ultra-multi-viewpoint display is mainly realized by displaying images under a plurality of viewpoints on a screen in a specific image arrangement manner and attaching a cylindrical lens array to the screen at a specific angle, so that images under different viewpoints are projected to different directions after passing through the cylindrical lens array. Therefore, the images under the different viewpoints are shown in the left and right eyes of a user to generate parallax by which a 3D display effect is created.

SUMMARY

The present disclosure provides a screen detection method, an apparatus and a device, a computer program and a readable medium.

In some embodiments of the present disclosure, a screen detection method is provided. The method includes:
receiving a cylindrical lens detection instruction for a target screen, wherein the cylindrical lens detection instruction at least includes target viewpoints;
acquiring browsing images shot from the target screen under the target viewpoints in response to the detection instruction, wherein the target screen is a screen of which a light emission side is provided with cylindrical lenses;
using the browsing images as viewpoint images under the condition that the browsing images include target contents; and
outputting detection parameters of the cylindrical lenses on the target screen based on image parameters of the viewpoint images.

Optionally, the step of acquiring the browsing images shot from the target screen under the target viewpoints in response to the detection instruction, wherein the target screen is the screen of which the light emission side is provided with the cylindrical lenses, includes:
adjusting viewpoints of an image acquisition device to the target viewpoints to shot the light emission side of the target screen, to acquire the browsing images.

Optionally, the step of adjusting the viewpoints of the image acquisition device to the target viewpoints so that the light emission side of the target screen is shot to acquire the browsing images includes:
adjusting a shooting position of the image acquisition device relative to the target screen to a target position so that the light emission side of the target screen is shot to acquire the browsing images.

Optionally, the step of adjusting the shooting position of the image acquisition device relative to the target screen to the target position includes:
adjusting shooting position parameters of the image acquisition device to make the shooting position of the image acquisition device located on the target position, wherein the shooting position parameters include at least one of a shooting angle, a shooting height and a shooting distance.

Optionally, at least two target contents are existed;
the step of taking the browsing images as the viewpoint images under the condition that the browsing images include the target contents includes:
taking the browsing images as the viewpoint images under the condition that the browsing images include the target contents, wherein viewpoints of at least two viewpoint images are located on a same straight line, and the straight line is parallel to a pixel surface of the target screen.

Optionally, the image parameters at least include placing heights of the cylindrical lenses;
the step of outputting the detection parameters of the cylindrical lenses on the target screen based on the image parameters of the viewpoint images includes:
acquiring viewpoint positions corresponding to the viewpoint images and pixel point positions on the pixel surface based on the viewpoint images;
acquiring a first pixel point distance between the pixel point positions corresponding to two adjacent viewpoint images on the same cylindrical lens; and
acquiring the placing heights of the cylindrical lenses on the target screen based on the viewpoint positions, the number of the viewpoints, the first pixel point distance and a refractive index of a medium from the cylindrical lenses to the pixel surface.

Optionally, the step of acquiring the placing heights of the cylindrical lenses on the target screen based on the viewpoint positions, the number of the viewpoints, the first pixel point distance and the refractive index of the medium from the cylindrical lenses to the pixel surface includes:
establishing space rectangular coordinates (x, y, z) by using a plane where the pixel surface of the target screen is located as an xy plane, acquiring spatial coordinate values of various viewpoint positions in the space rectangular coordinates, and outputting the placing heights of the cylindrical lenses on the target screen according to the following formula:

$$T = \frac{(N-1)nzP_{sub}}{|x_N - x_1|}$$

wherein T represents the placing heights, N represents the number of the viewpoints, n represents the refractive index of the medium from the cylindrical lenses to the pixel surface, $P_{sub}$ represents the first pixel point distance between the pixel point positions corresponding to two adjacent viewpoint images on the same cylindrical lens, $x_N$ represents an x-axis spatial coordinate value of an $N^{th}$ viewpoint image, $x_1$ represents an x-axis coordinate value of a first viewpoint image, and z represents a z-axis coordinate value of each viewpoint image, wherein N≥2, and N is a positive integer.

Optionally, the target contents include target transverse contents;
the step of taking the browsing images as the viewpoint images under the condition that the browsing images include the target contents includes:

taking the browsing images as the viewpoint images under the condition that all the transverse contents included in the browsing images are the target transverse contents.

Optionally, the detection parameters at least include a central distance between two adjacent cylindrical lenses;

the step of outputting the detection parameters of the cylindrical lenses on the target screen based on the image parameters of the viewpoint images includes:

acquiring the central distance between two adjacent cylindrical lenses based on the placing heights of the cylindrical lenses and the refractive index of the medium from the cylindrical lenses to the pixel surface.

Optionally, the step of acquiring the central distance between two adjacent cylindrical lenses based on the placing heights of the cylindrical lenses and the refractive index of the medium from the cylindrical lenses to the pixel surface includes:

outputting the central distance between two adjacent cylindrical lenses according to the following formula:

$$P_{lens} = \frac{T}{n}(\tan|\alpha_1| + \tan|\alpha_2|)$$

Wherein $P_{lens}$ represents the central distance between two adjacent cylindrical lenses, T represents the placing heights of the cylindrical lenses, n represents the refractive index of the medium from the cylindrical lenses to the pixel surface, and $\alpha_1$ and $\alpha_2$ respectively represent two viewing angles adjacent to 0° in distribution of brightness of the viewpoint images relative to the angles of the target viewpoints and respectively used as a first target viewing angle and a second target viewing angle.

Optionally, the step of acquiring the central distance between two adjacent cylindrical lenses based on the placing heights of the cylindrical lenses and the refractive index of the medium from the cylindrical lenses to the pixel surface includes:

outputting the central distance between two adjacent cylindrical lenses according to the following formula:

$$P_{lens} = \frac{L \cdot P_{pixel}}{L + T/n}$$

Wherein $P_{lens}$ represents the central distance between two adjacent cylindrical lenses, L represents viewing distances of the viewpoint images, $P_{pixel}$ represents a second pixel point distance between the pixel point positions corresponding to the viewpoint images on two adjacent cylindrical lenses, T represents the placing heights of the cylindrical lenses, and n represents the refractive index of the medium from the cylindrical lenses to the pixel surface.

Optionally, the target contents include a plurality of target longitudinal contents;

the step of taking the browsing images as the viewpoint images under the condition that the browsing images include the target contents includes:

taking the browsing images as the viewpoint images under the condition that the longitudinal contents included in the browsing images are at least two target longitudinal contents.

Optionally, the detection parameters at least include alignment angle deviations of the cylindrical lenses;

the step of outputting the detection parameters of the cylindrical lenses on the target screen based on the image parameters of the viewpoint images includes:

acquiring the number of the target longitudinal contents, viewpoint positions corresponding to the viewpoint images and pixel point positions on the pixel surface based on the viewpoint images;

acquiring a first pixel point distance between the pixel point positions corresponding to two adjacent viewpoint images on the same cylindrical lens and content widths of the target longitudinal contents on the viewpoint images; and acquiring alignment angle deviations of the cylindrical lenses based on the number of the target longitudinal contents, the first pixel point distance and the content widths.

Optionally, the step of acquiring the alignment angle deviations of the cylindrical lenses based on the number of the target longitudinal contents, the first pixel point distance and the content widths includes:

outputting the alignment angle deviations of the cylindrical lenses according to the following formula:

$$\Delta\theta = \arctan\left(\frac{N \cdot P_{sub}}{W}\right)$$

wherein $\Delta\theta$ represents the alignment angle deviations of the cylindrical lenses, N represents the number of the target longitudinal contents, $P_{sub}$ represents the first pixel point distance between the pixel point positions corresponding to two adjacent viewpoint images on the same cylindrical lens, and W represents the content widths of the target longitudinal contents on the viewpoint images.

Optionally, the step of taking the browsing images as the viewpoint images under the condition that the browsing images include the target contents includes:

taking the browsing images as the viewpoint images under the conditions that the browsing images are acquired by shooting the target screen under a front viewing angle and central contents located on central positions in the browsing images are not the target contents.

Optionally, the detection parameters at least include alignment position deviations of the cylindrical lenses;

the step of outputting the detection parameters of the cylindrical lenses on the target screen based on the image parameters of the viewpoint images includes:

acquiring the alignment position deviations of the cylindrical lenses based on the image parameters of the viewpoint images.

Optionally, the step of acquiring the alignment position deviations of the cylindrical lenses based on the image parameters of the viewpoint images includes:

outputting the alignment position deviations of the cylindrical lenses according to the following formula:

$$\Delta P = M \cdot P_{sub}$$

wherein $\Delta P$ represents the alignment position deviations of the cylindrical lenses, M represents difference values of the acquired central contents and the target contents, and $P_{sub}$ represents the first pixel point distance between the pixel point positions corresponding to two adjacent viewpoint images on the same cylindrical lens.

Optionally, the step of acquiring the alignment position deviations of the cylindrical lenses based on the image parameters of the viewpoint images includes:

outputting the alignment position deviations of the cylindrical lenses according to the following formula:

$$\Delta P = \frac{T}{n}|\tan\alpha_1 - \tan_2|$$

wherein $\Delta P$ represents the alignment position deviations of the cylindrical lenses, n represents the refractive index of the medium from the cylindrical lenses to the pixel surface, $\alpha_1$ and $\alpha_2$ respectively represent two viewing angles adjacent to 0° in distribution of brightness of the viewpoint images relative to the angles of the target viewpoints and respectively used as a first target viewing angle and a second target viewing angle.

Optionally, the step of taking the browsing images as the viewpoint images under the condition that the browsing images include the target contents includes:

taking the browsing images as the viewpoint images under the condition that a sharpness of designated contents in the browsing images is maximum.

Optionally, the detection parameters at least include curvature radii of the cylindrical lenses;

the step of outputting the detection parameters of the cylindrical lenses on the target screen based on the image parameters of the viewpoint images includes:

acquiring the viewing angles of the viewpoint images; and by adjusting curvature radii of optical simulation models of the cylindrical lenses, using the curvature radii as the curvature radii of the cylindrical lenses when the viewing angles at the maximum sharpness of the optical simulation models are the viewing angles of the viewpoint images.

Optionally, the sharpness is acquired by following steps:

acquiring the sharpness of the viewpoint images according to negative correlation between the contrasts and the sharpness of the viewpoint images.

Optionally, the step of outputting the detection parameters of the cylindrical lenses on the target screen based on the image parameters of the viewpoint images includes:

acquiring viewing angle brightness distribution curves of the cylindrical lenses; and by adjusting the curvature radii of the optical simulation models of the cylindrical lenses, using the curvature radii of the optical simulation models as the curvature radii of the cylindrical lenses when the similarity between the optical simulation models and the viewing angle brightness distribution curves of the cylindrical lenses meets a similarity demand.

Some embodiments of the present disclosure provide a screen detection apparatus, wherein the apparatus includes:

a receiving module configured to receive a cylindrical lens detection instruction for a target screen, wherein the cylindrical lens detection instruction at least includes target viewpoints;

a detection module configured to acquire browsing images shot from the target screen under the target viewpoints in response to the detection instruction, wherein the target screen is a screen of which the light emission side is provided with cylindrical lenses;

the browsing images are used as viewpoint images under the condition that the browsing images include target contents; and an output module configured to output detection parameters of the cylindrical lenses on the target screen based on image parameters of the viewpoint images.

Optionally, the detection module is further configured to:

adjust viewpoints of an image acquisition device to the target viewpoints so that the light emission side of the target screen is shot to acquire the browsing images.

Optionally, the detection module is further configured to:

adjust shooting position parameters of the image acquisition device to make the shooting position of the image acquisition device located on the target position, wherein the shooting position parameters comprise at least one of a shooting angle, a shooting height and a shooting distance.

Optionally, at least two target contents are existed;

Optionally, the detection module is further configured to:

use the browsing images as the viewpoint images under the condition that the browsing images comprise the target contents, wherein viewpoints of at least two viewpoint images are located on a same straight line, and the straight line is parallel to a pixel surface of the target screen.

Optionally, the image parameters at least comprise placing heights of the cylindrical lenses;

The output module is further configured to:

acquire viewpoint positions corresponding to the viewpoint images and pixel point positions on the pixel surface based on the viewpoint images;

acquire a first pixel point distance between the pixel point positions corresponding to two adjacent viewpoint images on the same cylindrical lens; and acquire the placing heights of the cylindrical lenses on the target screen based on the viewpoint positions, the number of the viewpoints, the first pixel point distance and a refractive index of a medium from the cylindrical lenses to the pixel surface.

Optionally, the output module is further configured to:

establish space rectangular coordinates (x, y, z) by using a plane where the pixel surface of the target screen is located as an xy plane, acquiring spatial coordinate values of various viewpoint positions in the space rectangular coordinates, and outputting the placing heights of the cylindrical lenses on the target screen according to the following formula:

$$T = \frac{(N-1)nzP_{sub}}{|x_N - x_1|}$$

wherein T represents the placing heights, N represents the number of the viewpoints, n represents the refractive index of the medium from the cylindrical lenses to the pixel surface, $P_{sub}$ represents the first pixel point distance between the pixel point positions corresponding to two adjacent viewpoint images on the same cylindrical lens, $x_N$ represents an x-axis spatial coordinate value of an $N^{th}$ viewpoint image, $x_1$ represents an x-axis coordinate value of a first viewpoint image, and z represents a z-axis coordinate value of each viewpoint image, wherein $N \geq 2$, and N is a positive integer.

Optionally, the target contents comprise target transverse contents;

The output module is further configured to:

use the browsing images as the viewpoint images under the condition that all the transverse contents comprised in the browsing images are the target transverse contents.

Optionally, the detection parameters at least comprise a central distance between two adjacent cylindrical lenses;

The output module is further configured to:

output the central distance between two adjacent cylindrical lenses according to the following formula:

$$P_{lens} = \frac{T}{n}(\tan|\alpha_1| + \tan|\alpha_2|)$$

Wherein $P_{lens}$ represents the central distance between two adjacent cylindrical lenses, T represents the placing heights of the cylindrical lenses, n represents the refractive index of the medium from the cylindrical lenses to the pixel surface, and $\alpha_1$ and $\alpha_2$ respectively represent two viewing angles adjacent to 0° in distribution of brightness of the viewpoint images relative to the angles of the target viewpoints and respectively used as a first target viewing angle and a second target viewing angle.

The output module is further configured to:

output the central distance between two adjacent cylindrical lenses according to the following formula:

$$P_{lens} = \frac{L \cdot P_{pixel}}{L + T/n}$$

Wherein $P_{lens}$ represents the central distance between two adjacent cylindrical lenses, L represents viewing distances of the viewpoint images, $P_{pixel}$ represents a second pixel point distance between the pixel point positions corresponding to the viewpoint images on two adjacent cylindrical lenses, T represents the placing heights of the cylindrical lenses, and n represents the refractive index of the medium from the cylindrical lenses to the pixel surface.

Optionally, the target contents comprise a plurality of target longitudinal contents;

The output module is further configured to:

use the browsing images as the viewpoint images under the condition that the longitudinal contents comprised in the browsing images are at least two target longitudinal contents.

Optionally, the detection parameters at least comprise alignment angle deviations of the cylindrical lenses;

The output module is further configured to:

acquire the number of the target longitudinal contents, viewpoint positions corresponding to the viewpoint images and pixel point positions on the pixel surface based on the viewpoint images;

acquire a first pixel point distance between the pixel point positions corresponding to two adjacent viewpoint images on the same cylindrical lens and content widths of the target longitudinal contents on the viewpoint images; and acquire alignment angle deviations of the cylindrical lenses based on the number of the target longitudinal contents, the first pixel point distance and the content widths.

The output module is further configured to:

output the alignment angle deviations of the cylindrical lenses according to the following formula:

$$\Delta\theta = \arctan\left(\frac{N \cdot P_{sub}}{W}\right)$$

wherein $\Delta\theta$ represents the alignment angle deviations of the cylindrical lenses, N represents the number of the target longitudinal contents, $P_{sub}$ represents the first pixel point distance between the pixel point positions corresponding to two adjacent viewpoint images on the same cylindrical lens, and W represents the content widths of the target longitudinal contents on the viewpoint images.

Optionally, the detection module is further configured to:

use the browsing images as the viewpoint images under the conditions that the browsing images are acquired by shooting the target screen under a front viewing angle and central contents located on central positions in the browsing images are not the target contents.

Optionally, the detection parameters at least comprise alignment position deviations of the cylindrical lenses;

The output module is further configured to:

acquire the alignment position deviations of the cylindrical lenses based on the image parameters of the viewpoint images.

Optionally, the output module is further configured to:

output the alignment position deviations of the cylindrical lenses according to the following formula:

$$\Delta P = M \cdot P_{sub}$$

wherein $\Delta P$ represents the alignment position deviations of the cylindrical lenses, M represents difference values of the acquired central contents and the target contents, and $P_{sub}$ represents the first pixel point distance between the pixel point positions corresponding to two adjacent viewpoint images on the same cylindrical lens.

Optionally, the output module is further configured to:

output the alignment position deviations of the cylindrical lenses according to the following formula:

$$\Delta P = \frac{T}{n}|\tan\alpha_1 - \tan\alpha_2|$$

wherein $\Delta P$ represents the alignment position deviations of the cylindrical lenses, n represents the refractive index of the medium from the cylindrical lenses to the pixel surface, $\alpha_1$ and $\alpha_2$ respectively represent two viewing angles adjacent to 0° in distribution of brightness of the viewpoint images relative to the angles of the target viewpoints and respectively used as a first target viewing angle and a second target viewing angle.

Optionally, the detection module is further configured to:

use the browsing images as the viewpoint images under the condition that a sharpness of designated contents in the browsing images is maximum.

Optionally, the detection parameters at least comprise curvature radii of the cylindrical lenses;

The output module is further configured to:

acquire the viewing angles of the viewpoint images; and by adjusting curvature radii of optical simulation models of the cylindrical lenses, using the curvature radii as the curvature radii of the cylindrical lenses when the viewing angles at the maximum sharpness of the optical simulation models are the viewing angles of the viewpoint images.

Optionally, the detection module is further configured to:

acquire the sharpness of the viewpoint images according to negative correlation between the contrasts and the sharpness of the viewpoint images.

Optionally, the output module is further configured to:
acquire viewing angle brightness distribution curves of the cylindrical lenses; and
by adjusting the curvature radii of the optical simulation models of the cylindrical lenses, using the curvature radii of the optical simulation models as the curvature radii of the cylindrical lenses when the similarity between the optical simulation models and the viewing angle brightness distribution curves of the cylindrical lenses meets a similarity demand.

Some embodiments of the present disclosure provide a computing processing device, wherein, the computing processing device comprises:
a memory storing a computer readable code; and
one or more processors, wherein when the computer readable code is executed by the one or more processors, the computing processing device executes the screen detection method described above.

Some embodiments of the present disclosure provide a computer program, the computer program comprises a computer readable code, when the computer readable code runs on a computing processing device, causes the computing processing device to execute the screen detection method described above.

Some embodiments of the present disclosure provide a computer readable medium, wherein the computer readable medium stores a computer program for the screen detection method described above.

The above-mentioned description is only the summarization of technical solutions of the present disclosure. In order to know about the technical means of the present disclosure more clearly to achieve the purpose of implementation according to the content of the description and make the above-mentioned and other objectives, features and advantages of the present disclosure more obvious and comprehensible, specific embodiments of the present disclosure will be described below.

BRIEF DESCRIPTION OF THE DRAWINGS

In order to more clearly illustrate the technical solutions of the embodiments of the present disclosure or the prior art, the figures that are required to describe the embodiments or the prior art will be briefly introduced below. Apparently, the figures that are described below are embodiments of the present disclosure, and a person skilled in the art can obtain other figures according to these figures without paying creative work. It should be noted that the ratios in the drawings are merely illustrative and do not represent actual ratios.

FIG. 1 schematically shows a schematic diagram of a process of a screen detection method provided in some embodiments of the present disclosure;

FIG. 2 schematically shows a schematic diagram of a principle of a screen detection method provided in some embodiments of the present disclosure;

FIG. 14 schematically shows a fifth schematic diagram of the process of another screen detection method provided in some embodiments of the present disclosure;

FIG. 15 schematically shows a fifth schematic diagram of the principle of another screen detection method provided in some embodiments of the present disclosure;

FIG. 16 schematically shows a fourth schematic diagram of the effect of another screen detection method provided in some embodiments of the present disclosure;

DETAILED DESCRIPTION OF THE EMBODIMENTS

Figure 3:
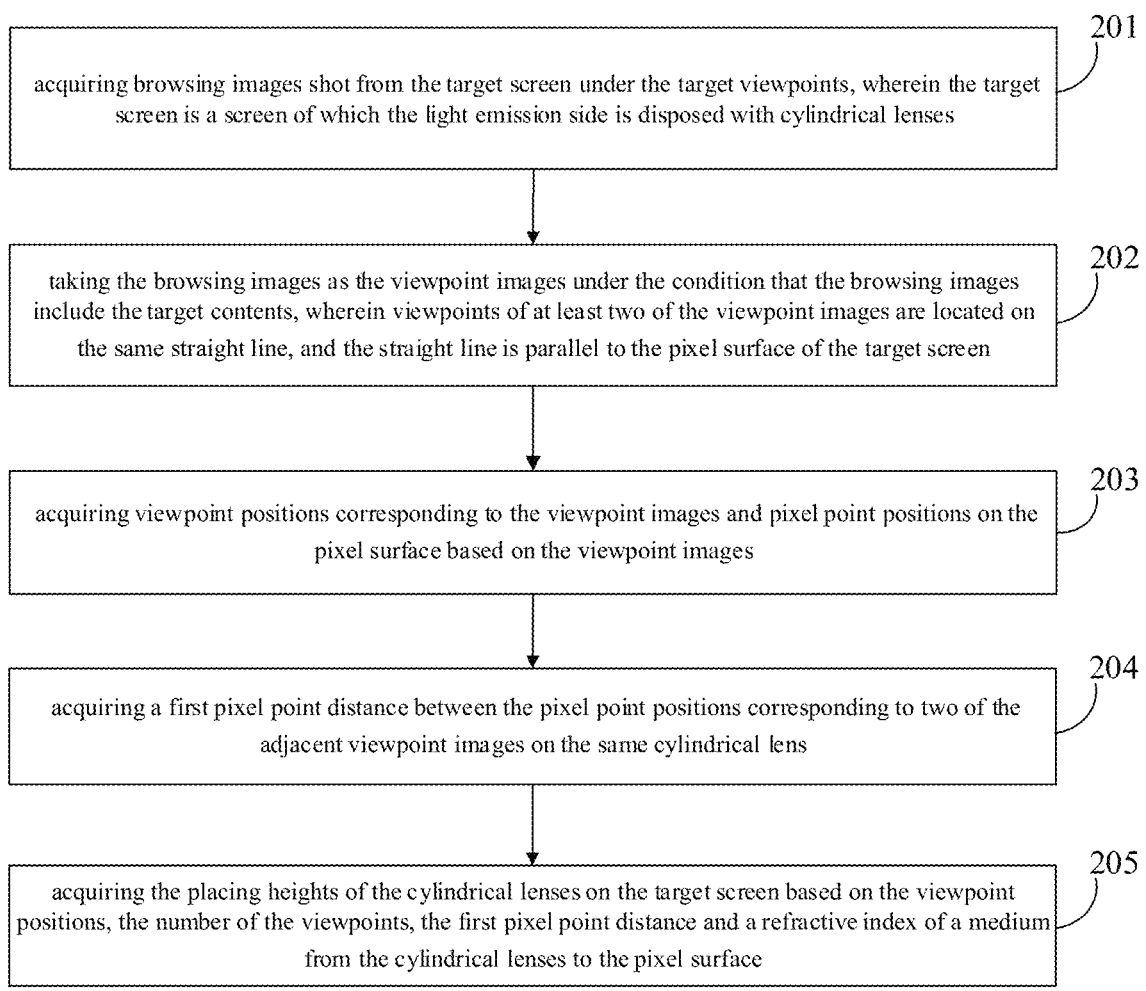
FIG. 3 schematically shows a first schematic diagram of a process of another screen detection method provided in some embodiments of the present disclosure.

In order to make the objects, the technical solutions, and the advantages of the embodiments of the present disclosure clearer, the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

In the related art, various parameters of cylindrical lenses correspond to image arrangement manners. When actual parameters of the cylindrical lenses are deviated from design values due to factors such as a process, a viewing effect may be directly affected, and thus, the display effect needs to be corrected by correcting process conditions or changing the image management manners according to actual parameters. However, sometimes, it is difficult to measure the actual parameters of the cylindrical lenses due to limitations of detection conditions, and therefore, the present disclosure proposes that specific images are displayed by virtue of a screen, the displayed images are analyzed, and thus, the detection parameters of the cylindrical lenses on the screen are detected.

FIG. 1 schematically shows a schematic diagram of a process of a screen detection method provided by the present disclosure. An execution subject of the method may be any one electronic device, for example, the method may be applied to an application with a screen detection function and may be executed by a server or terminal device of the application. The method includes:

step 101, a cylindrical lens detection instruction for a target screen is received, wherein the cylindrical lens detection instruction at least includes target viewpoints;

step 102, browsing images shot from the target screen under the target viewpoints are acquired in response to the detection instruction, wherein the target screen is a screen of which a light emission side is provided with cylindrical lenses.

In some embodiments of the present disclosure, the target screen is a display device of which the light emission side is provided with cylindrical lenses, and the cylindrical lenses may be disposed in a specific array arrangement manner. Image rays under different viewpoints in the target screen may be projected to different directions after encountering the cylindrical lenses, and therefore, it is ensured that different images are viewed by the double eyes of a user from different viewpoints by arranging the image arrangement manners of images displayed by the target screen. Accordingly, the browsing images shot by an image acquisition device under different shooting viewpoints may also be different. Wherein, the target viewpoints refer to shooting viewpoints required for shooting the target screen, may be voluntarily set by the user or automatically set by a system according to detection demands and may be specifically set according to actual demands, which is not limited herein.

Step 103, the browsing images are used as viewpoint images under the condition that the browsing images include target contents.

In some embodiments of the present disclosure, the target contents refer to display contents required in the viewpoint images participating in this detection. It can be understood that the contents of the browsing images of the target screen under different viewpoints are different, if the image contents included in the browsing images are different, it is proven that the shooting viewpoints of the browsing images are also different, and thus, by setting the target contents, it is determined whether the browsing images are acquired by shooting the target screen under the viewpoints required in this detection. Specifically, by setting a corresponding relation between the image contents displayed by the target screen and the shooting viewpoints, the viewpoint images including the target contents may be selected according to the image contents included in the browsing images acquired by shooting; if the browsing images include the target contents, the browsing images are used as the viewpoint images; and if the browsing images do not include the target contents, the browsing images are filtered.

Exemplarily, figures arrayed in a full screen may be displayed on the target screen, and thus, the browsing images under different shooting viewpoints are different figures; if there are no deviations in detection parameters of the cylindrical lenses of the target screen, that is, the detection parameters are standard parameters, the image contents in the browsing images of the target screen are the same figure; and if there are deviations in the detection parameters of the cylindrical lenses of the target screen, there are different figures in the image contents in the browsing images of the target screen, so that it may be determined whether there are deviations in the detection parameters of the cylindrical lenses on the target screen according to the determination whether there are different figures in the browsing images under different viewpoints. Reference is made to FIG. 2, wherein 2-1, 2-2 and 2-3 are sequentially the browsing images under a first viewpoint, a second viewpoint and a third viewpoint when there are no deviations in the detection parameters of the cylindrical lenses of the target screen; and 2-4, 2-5 and 2-6 are sequentially the browsing images under the first viewpoint, the second viewpoint and the third viewpoint when there are deviations in the detection parameters of the cylindrical lenses of the target screen. It is thus clear that if there are not deviations in the detection parameters of the cylindrical lenses, the image contents of each of the browsing images 2-1, 2-2 and 2-3 under the three shooting viewpoints only include "1", "2" and "3"; and when there are deviations in the detection parameters of the cylindrical lenses, the partial image content of the browsing image 2-3 under the first viewpoint is "1", and there are further other image contents "2" and "3", which is obviously different from that the image content of the browsing image under the first viewpoint only includes "1" when there are no deviations in the detection parameters of the cylindrical lenses, thus it may be determined that there are deviations in the detection parameters of the cylindrical lenses corresponding to the browsing image 2-3. Similarly, there are also deviations in the detection parameters of browsing images 2-5 and 2-6.

Step 104, detection parameters of the cylindrical lenses on the target screen are output based on image parameters of the viewpoint images.

In some embodiments of the present disclosure, the detection parameters refer to actual index parameters of the cylindrical lenses required to be detected. There may be deviations between the detection parameters of the cylindrical lenses and expected parameters due to factors such as a process during the processing of the cylindrical lenses, and these deviations may cause deviations between the browsing images actually displayed by the target screen under different viewpoints and the browsing images under different viewpoints when standard parameters are provided. For example, the image contents which should be included in the browsing images of the target screen under specific viewpoints when the standard parameters are provided are 1, but in fact, the image contents included in the browsing images under the specific viewpoints may be 2 due to deviations existing in the detection parameters of the cylindrical lenses. However, the image contents included in the browsing images under different shooting viewpoints are affected by the detection parameters of the cylindrical lenses, and therefore, the detection parameters of the cylindrical lenses may be acquired by analysis according to the image parameters such as viewpoint positions, image brightness and image contrast in the viewpoint images including the target contents.

In the embodiments of the present disclosure, by selecting the viewpoint images including the target contents from the browsing images acquired by shooting the screen under the specific viewpoints, the detection parameters of the cylindrical lenses on the screen are detected according to the image parameters of the viewpoint images, so that all the detection parameters of the cylindrical lenses on the screen can be acquired efficiently and conveniently, and the detection efficiency of the detection parameters of the cylindrical lenses on the screen is increased.

Optionally, the step 102 may include the step that viewpoints of an image acquisition device are adjusted to the target viewpoints so that the light emission side of the target screen is shot to acquire the browsing images.

In the embodiments of the present disclosure, the image acquisition device may be an electronic device with an image acquisition function and may have functions such as data processing, data storage and data transmission, and a system may be connected to the image acquisition device through a transmission apparatus, so that the transmission apparatus is controlled to adjust the shooting viewpoints of the image acquisition device. Of course, the image acquisition device may also be artificially adjusted to shoot the target screen, and specific setting may be based on actual demands and is not limited herein. The target viewpoints are shooting viewpoints required for shooting the light emission side of the target screen and may be fixed viewpoints specified in advance or shooting viewpoints selected randomly or viewpoints adaptively adjusted according to different detection parameters, for example, shooting is performed under front viewpoints or 30° viewpoints, and specifically viewpoints may be set according to actual demands and are not limited herein.

In some embodiments of the present disclosure, the shooting viewpoints of the image acquisition device may be adjusted to the target viewpoints required by this shooting, and then, shooting is performed, so that the browsing images of the target screen are acquired. By adjusting the shooting viewpoints of the image acquisition device to the target viewpoints, the light emission side of the target screen is shot, so that the browsing images required by this detection may be rapidly acquired.

Optionally, the step 101 may include the step that:
 a shooting position of the image acquisition device relative to the target screen is adjusted to a target position so that the light emission side of the target screen is shot to acquire the browsing image.

In some embodiments of the present disclosure, the system may be connected to the image acquisition device through the transmission apparatus, and the transmission apparatus is controlled to adjust the shooting position of the image acquisition device, so that the image acquisition device is conveniently adjusted.

Optionally, the step 101 may include the step that shooting position parameters of the image acquisition device are adjusted to make the shooting position of the image acquisition device located on the target position, wherein the shooting position parameters include at least one of a shooting angle, a shooting height and a shooting distance.

In some embodiments of the present disclosure, the target angle refers to shooting angles for shooting the browsing images in this detection, the target position refers to a shooting position for acquiring the browsing images relative to the light emission side of the target screen in this detection, and the target height refers to a height of the image acquisition device relative to the ground. Specifically, by setting the position parameters including at least one of the shooting angle, the shooting height and the shooting distance, the image acquisition device is adjusted to the target position by virtue of the transmission apparatus, so that the light emission side of the target screen may be shot, and the convenient adjustment for the image acquisition device is achieved.

Optionally, in some embodiments of the present disclosure, at least two target contents are provided, and the image parameters at least include placing heights of the cylindrical lenses. Reference is made to FIG. 3 which shows a first schematic diagram of a process of another screen detection method provided by the present disclosure. The method includes the steps.

Step 201, browsing images shot from the target screen under the target viewpoints are acquired, wherein the target screen is a screen of which the light emission side is provided with cylindrical lenses.

In the embodiments of the present disclosure, the placing heights of the cylindrical lenses refer to actual distances between the upper surfaces of the cylindrical lenses and a pixel surface of the target screen. Since the contents of the browsing images displayed by the target screen under different shooting viewpoints are different, the target viewpoints may be set as a plurality of shooting viewpoints located on the same straight line, and the straight line where the plurality of shooting viewpoints are located is parallel to the pixel surface of the target screen, so that the light emission side of the target screen is shot to acquire a plurality of browsing images in which a plurality of different contents displayed by the target screen under the different viewpoints may be included. If there are N image contents displayed by the target screen, N browsing images including the N image contents may be respectively shot by setting a plurality of shooting viewpoints on the straight line parallel to the pixel surface of the target screen.

Exemplarily, if the image contents displayed by the target screen include four figures "1", "2", "3" and "4", and the image contents under each the shooting viewpoints are different, the light emission side of the target screen may be shot by setting a plurality of shooting viewpoints on the straight line parallel to the pixel surface of the target screen, so that a plurality of browsing images respectively including "1", "2", "3" and "4" may be acquired.

Step 202, the browsing images are used as the viewpoint images under the condition that the browsing images include the target contents, wherein viewpoints of at least two viewpoint images are located on the same straight line, and the straight line is parallel to the pixel surface of the target screen.

In the embodiments of the present disclosure, in order to ensure that the viewpoint images for parameter detection may clearly reflect the image contents displayed by the target screen under the different shooting viewpoints and to prevent the cross image contents under the different shooting viewpoints from affecting the subsequent parameter detection, the viewpoint images participating in the parameter detection may be screened from the browsing images according to the determination whether the browsing images only include one target content. For example, when the target contents are the four figures "1", "2", "3" and "4", four browsing images, that is, a browsing image only including "1", a browsing image only including "2", a browsing image only including "3" and a browsing image only including "4" may be selected as the viewpoint images from the browsing images. Of course, exemplary description is only shown herein, a setting manner of specific target contents may be determined according to actual demands and is not limited herein.

Step 203, viewpoint positions corresponding to the viewpoint images and pixel point positions on the pixel surface are acquired based on the viewpoint images.

In the embodiments of the present disclosure, screen rays emitted by light emitting components corresponding to pixel points on the pixel surface of the target screen reach the viewpoint positions where all the shooting viewpoints are located after being refracted by the cylindrical lenses, so that the viewpoint positions corresponding to the viewpoint images correspond to the pixel point positions on the pixel surface one to one, and the viewpoint images and the target screen may be observed and analyzed to acquire the viewpoint positions of the viewpoint images and the pixel point positions corresponding to the viewpoint images on the pixel surface of the target screen.

Step 204, a first pixel point distance between the pixel point positions corresponding to two adjacent viewpoint images on the same cylindrical lens is acquired.

In the embodiments of the present disclosure, two adjacent pixel points, where the screen rays on the viewpoint positions where two adjacent viewpoint images are located are emitted by light emitting components, on the pixel surface of the target screen are determined by observing optical paths of the screen rays refracted by the same cylindrical lens, so that the actual distance between the adjacent pixel points is used as the first pixel point distance. The distances between the adjacent pixel points in the pixel points on the pixel surface are the same, and therefore, pixel point distances between other pairs of adjacent pixel points may be reflected by the first pixel point distance between any one pair of adjacent pixel points.

Step 205, the placing heights of the cylindrical lenses on the target screen are acquired based on the viewpoint positions, the number of the viewpoints, the first pixel point distance and a refractive index of a medium from the cylindrical lenses to the pixel surface.

In the embodiments of the present disclosure, found by experiments, the placing heights of the cylindrical lenses are positively correlated to the sum of the first pixel point distances, are positively correlated to the refractive index of the medium from the cylindrical lenses to the pixel surface, are positively correlated to a ratio of a distance from the screen where the shooting viewpoints are located to the pixel surface to a distance between the adjacent shooting viewpoints, and therefore, an algorithm may be set according to the viewpoint positions, the number of the viewpoints, the first pixel point distance and the refractive index of the medium to calculate the placing heights of the cylindrical lenses on the target screen.

Optionally, the step 205 includes:

space rectangular coordinates (x, y, z) are established by using a plane where the pixel surface of the target screen is located as an xy plane, spatial coordinate values of various viewpoint positions in the space rectangular coordinates are acquired, and the placing heights of the cylindrical lenses on the target screen are output according to the following formula:

$$T = \frac{(N-1)nzP_{sub}}{|x_N - x_1|}$$

wherein T represents the placing heights, N represents the number of the viewpoints, n represents the refractive index of the medium from the cylindrical lenses to the pixel surface, $P_{sub}$ represents the first pixel point distance between the pixel point positions corresponding to two adjacent viewpoint images on the same cylindrical lens, $x_N$ represents an x-axis spatial coordinate value of an Nth viewpoint image, $x_1$ represents an x-axis coordinate value of a first viewpoint image, and z represents a z-axis coordinate value of each viewpoint image, wherein N≥2, and N is a positive integer.

In the embodiments of the present disclosure, in order to normalize the viewpoint positions of all the viewpoint images, the plane where the pixel surface of the target screen is located may be used as the xy plane. Specifically, planar spatial coordinates may be established by using a straight line where the target viewpoints are located as an x axis, a vertical line of the x axis on the plane where the pixel surface is located as a y axis and a straight line vertical to the plane where the pixel surface is located as a z axis, and the spatial coordinate values of all the target viewpoints in the planar spatial coordinates are used as the viewpoint positions of all the target viewpoints to be substituted into the formula so as to be calculated. An air surface located between the lower surface of each of the cylindrical lenses and the pixel surface also plays a certain role in refracting the screen rays, and therefore, it is necessary to introduce the refractive index n of the medium from the cylindrical lenses to the pixel surface to the formula correct the calculation process, influences of the refraction effect of the air surface to the calculated placing heights of the cylindrical lenses are minimized, and the accuracy of the detected placing heights of the cylindrical lenses is guaranteed.

Figures 4, 5:
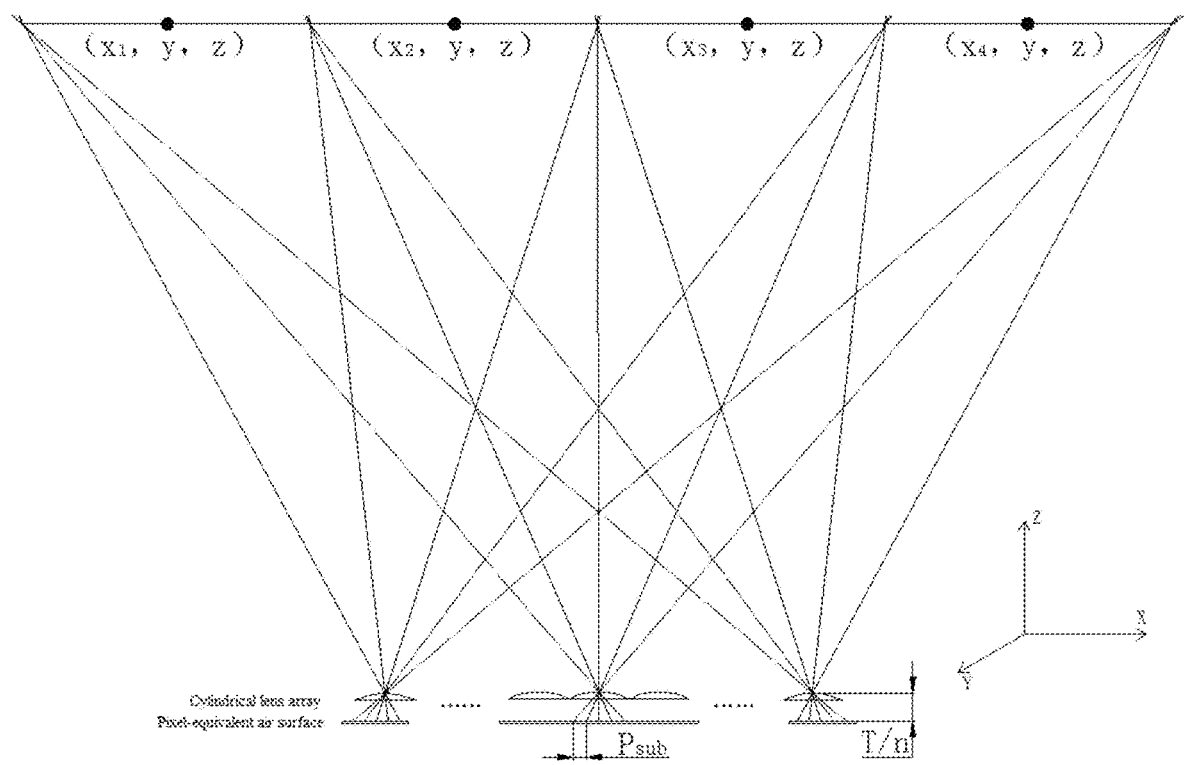
FIG. 4 schematically shows a first schematic diagram of a principle of another screen detection method provided in some embodiments of the present disclosure.
FIG. 5 schematically shows a first schematic diagram of an effect of another screen detection method provided in some embodiments of the present disclosure.

Exemplarily, reference is made to FIG. 4, wherein space rectangular coordinates are established by using the plane where the pixel surface is located as the xy plane, the straight line where the target viewpoints are located as the x axis, a vertical line of the x axis on the xy plane as the y axis and a vertical line of the xy plane as the z axis. With four target viewpoints as examples, it is known from a diagram showing an optical path that spatial coordinate values of the four target viewpoints are respectively (x1, y, z), (x2, y, z), (x3, y, z) and (x4, y, z), the light emission side of the target screen is sequentially shot under the target viewpoints, and thus, the four viewpoint images only including the viewpoint contents "1", "2", "3" and "4" respectively as shown in FIG. 5 may be acquired. It can be understood that if there are N viewpoints, viewpoint images fully or partially including the figure "N" may be shot on the coordinates (xN, y, z). Reference is made to FIG. 5, spatial coordinate values of the four viewpoint images are respectively (−57, 0, 350), (−19, 0, 350), (19, 0, 350) and (57, 0, 350), at the moment, if the first pixel point distance $P_{sub}$ is 8.725 μm and the refractive index n of the medium is 1.53, the spatial coordinate values of the viewpoint images, the first pixel point distance and the refractive index of the medium are substituted into the formula for calculation, and thus, the placing heights T of the cylindrical lenses may be calculated to be equal to 120.5 μm.

Figure 6:
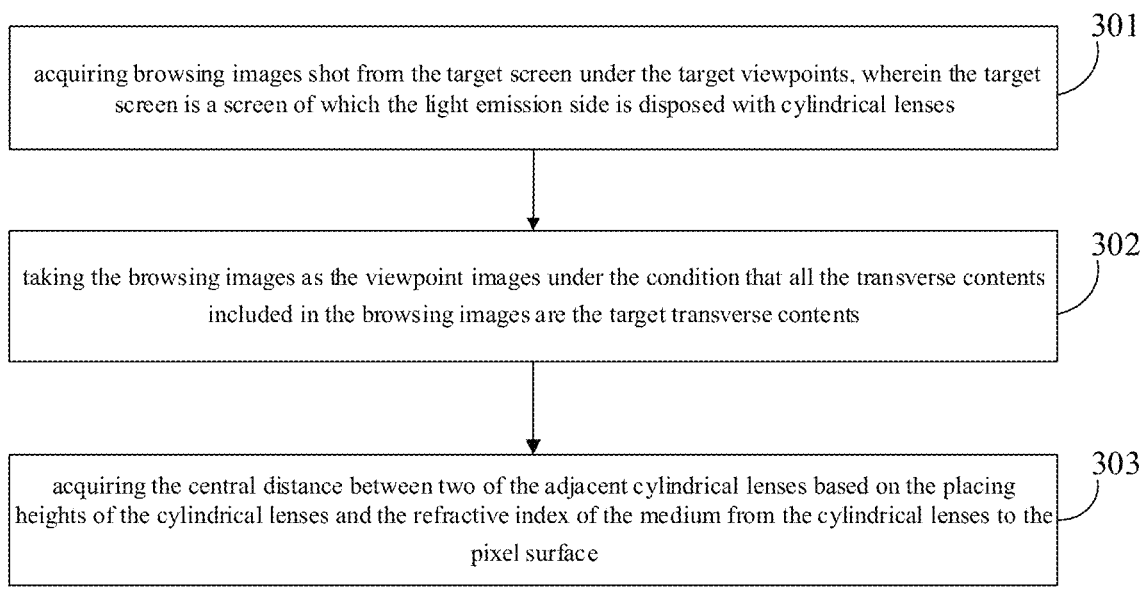
FIG. 6 schematically shows a second schematic diagram of the process of another screen detection method provided in some embodiments of the present disclosure.

Optionally, in some embodiments of the present disclosure, the target contents include target transverse contents, and the detection parameters at least include a central distance between two adjacent cylindrical lenses. Reference is made to FIG. 6 which shows a second schematic diagram of a process of another screen detection method provided by the present disclosure. The method includes:

step 301, browsing images shot from the target screen under the target viewpoints are acquired, wherein the target screen is a screen of which the light emission side is provided with cylindrical lenses.

In the embodiments of the present disclosure, the central distance refers to an actual distance between two adjacent cylindrical lenses in a cylindrical lens array of the target screen. The browsing images capable of showing different viewing effects may be acquired by adjusting the shooting distance between the image acquisition device and the target screen. It is noteworthy that the contents of the browsing images with the image contents displayed by the target screen under different viewpoints are different, but for a maker of the image contents, viewpoints where a user may clearly view specific contents in the browsing images may be regarded as expected viewing distances meeting an expected demand, but there may be deviations in the detection parameters of the cylindrical lenses, and therefore, there may also be deviations between actual viewing distances generated when an actual user clearly views the specific contents in the browsing images and the expected viewing distances, and then, the actual viewing distances between the shooting viewpoints and the screen when the specific contents may be actually and clearly viewed need to be determined by performing image acquisition on the target screen.

Step 302, the browsing images are used as the viewpoint images under the condition that all the transverse contents included in the browsing images are the target transverse contents.

In the embodiments of the present disclosure, the transverse contents refer to image contents transversely disposed in the browsing images, the target transverse contents refer to transverse contents which need to be included in the viewpoint images required for participating in this parameter detection, and the target transverse contents may be set according to the image contents included in the image contents displayed by the target screen. For example, if the image contents are four figures "1", "2", "3" and "4" disposed in rows, the target transverse contents may be set in a manner that the figures included in each row of transversely disposed contents are the same, and the browsing images include all the four figures, so that the viewing distances of the browsing images including the four figures and having the same figure in each row may be used as the actual viewing distances within which the image contents may be clearly viewed, and the browsing images are used as the viewpoint images participating in parameter detection.

Step 303, the central distance between two adjacent cylindrical lenses is acquired based on the placing heights of the cylindrical lenses and the refractive index of the medium from the cylindrical lenses to the pixel surface.

In the embodiments of the present disclosure, found by experiments, the central distance between two adjacent cylindrical lenses is positively correlated to a product of a second pixel point distance and the viewing distances, is negatively correlated to the sum of the viewing distances and the placing heights of the cylindrical lenses and is directly proportional to the refractive index of the medium from the cylindrical lenses to the pixel surface, and therefore, the central distance between two adjacent cylindrical lenses may be calculated by establishing an algorithm formula based on the viewing distances, the second pixel point distance, the placing heights of the cylindrical lenses and the refractive index of the medium.

Optionally, the step 303 includes the step that the central distance between two adjacent cylindrical lenses is output according to the following formula:

$$P_{lens} = \frac{L \cdot P_{pixel}}{L + T/n}$$

wherein $P_{lens}$ represents the central distance between two adjacent cylindrical lenses, L represents viewing distances of the viewpoint images, $P_{pixel}$ represents a second pixel point distance between the pixel point positions corresponding to the viewpoint images on two adjacent cylindrical lenses, T represents the placing heights of the cylindrical lenses, and n represents the refractive index of the medium from the cylindrical lenses to the pixel surface.

In the embodiments of the present disclosure, rays for a user who is an audience to view the viewpoint images are emitted after being refracted by the cylindrical lenses, so that the viewpoint positions of the viewpoint images may be regarded as positions where eyes of the user are located, and then, vertical distances from the viewpoint positions to the screen where the cylindrical lenses are located may be used as the viewing distances of the viewpoint images. Two adjacent pixel points, where the screen rays on the viewpoint position where the same viewpoint image is located are emitted by light emitting components and are refracted by the two cylindrical lenses, on the pixel surface of the target screen are determined by observing optical paths of the screen rays refracted by two adjacent cylindrical lenses, so that the actual distance between the two adjacent pixel points is used as the second pixel point distance. If the central distances among all the cylindrical lenses in the cylindrical lens array of the target screen are the same, the central distances among all the adjacent cylindrical lenses may be represented by the second pixel point distance, which is, of course, performed under an ideal condition, generally, set distances between different pairs of cylindrical lenses have certain errors, and therefore, the second pixel point distance corresponding to each pair of adjacent cylindrical lenses may be independently detected.

Figures 7, 8:
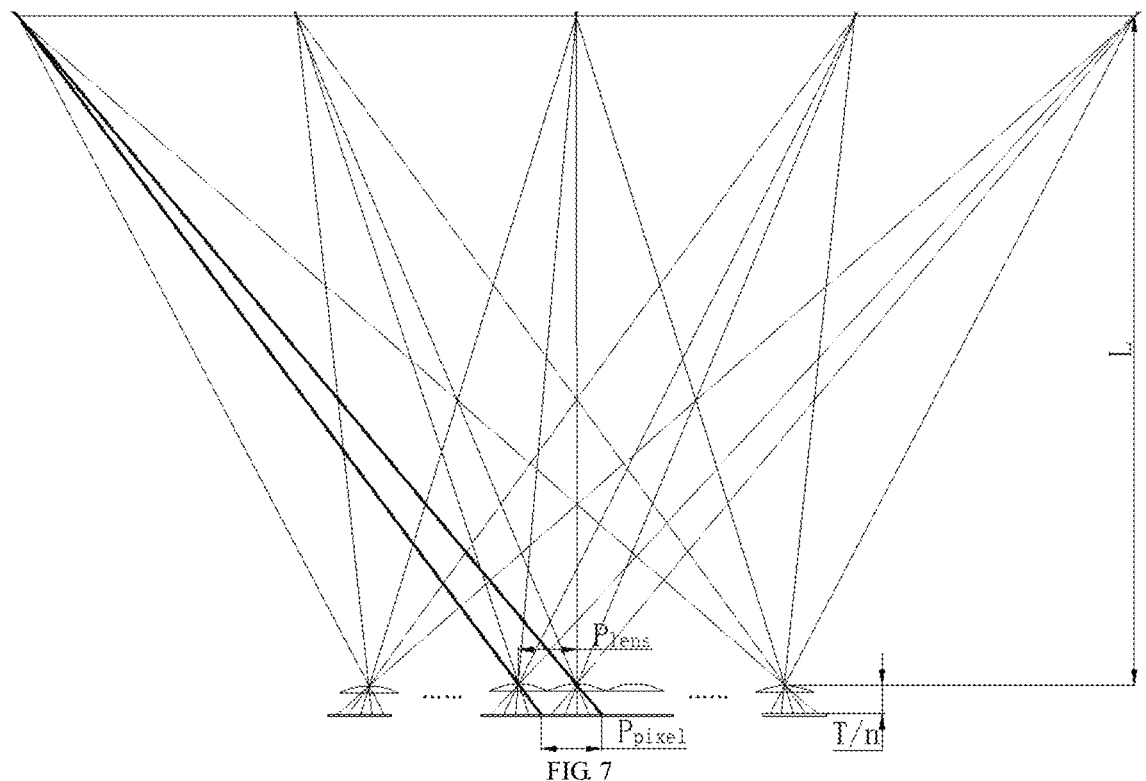
FIG. 7 schematically shows a second schematic diagram of the principle of another screen detection method provided in some embodiments of the present disclosure.
FIG. 8 schematically shows a second schematic diagram of the effect of another screen detection method provided in some embodiments of the present disclosure.

Reference is made to FIG. 7, known from the geometrical relationship in the diagram, by only acquiring the viewing distances L, the second pixel point distance $P_{pixel}$, the viewing distances, the placing heights T of the cylindrical lenses and the refractive index n of the medium may be substituted into the above-mentioned formula for calculation, so that the central distance $P_{lens}$ between two adjacent cylindrical lenses is acquired.

Exemplarily, if $P_{pixel}$=54.9 μm, n=1.53, and T=120.5 μm, the viewing distance L=650 mm of the shot viewpoint image with an effect as shown in FIG. 8 is substituted into the above-mentioned formula, and thus, the central distance $P_{lens}$ between two adjacent cylindrical lenses may be calculated to be equal to 54.8933 μm.

Figure 9:
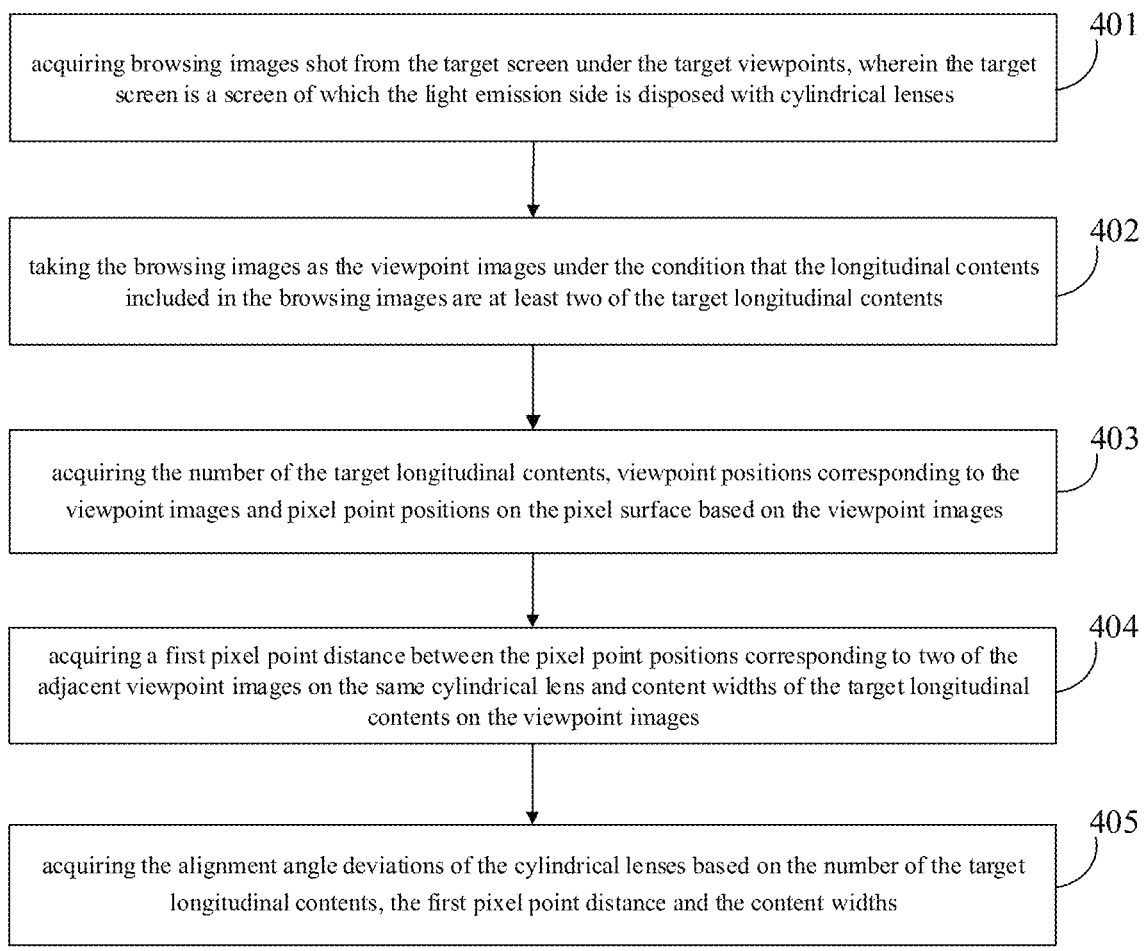
FIG. 9 schematically shows a third schematic diagram of the process of another screen detection method provided in some embodiments of the present disclosure.

Optionally, in some embodiments of the present disclosure, the target contents include a plurality of target longitudinal contents, and the detection parameters at least include alignment angle deviations of the cylindrical lenses. Reference is made to FIG. 9 which shows a third schematic diagram of the process of another screen detection method provided by the present disclosure. The method includes:

optionally, the step 303 may include:

the central distance between two adjacent cylindrical lenses is output according to the following formula:

$$P_{lens} = \frac{T}{n}(\tan|\alpha_1| + \tan|\alpha_2|)$$

wherein $P_{lens}$ represents the central distance between two adjacent cylindrical lenses, T represents the placing heights of the cylindrical lenses, n represents the refractive index of the medium from the cylindrical lenses to the pixel surface, and $\alpha_1$ and $\alpha_2$ respectively represent two viewing angles adjacent to 0° in distribution of brightness of the viewpoint images relative to the angles of the target viewpoints and respectively used as a first target viewing angle and a second target viewing angle.

In the embodiments of the present disclosure, reference is made to the above-mentioned formula, under the condition that the first target viewing angle, the second target viewing angle, the refractive index of the medium from the cylindrical lenses to the pixel surface and the viewing distance are known, the central distance between two adjacent cylindrical lenses and the placing heights of the cylindrical lenses may be deduced in combination with the following formula (1):

$$\frac{P_{lens}}{P_{pixel}} = \frac{L}{L + T/n} \quad (1)$$

wherein $P_{lens}$ represents the central distance between two adjacent cylindrical lenses, $P_{pixel}$ r represents the second pixel point distance between the pixel point positions corresponding to the viewpoint images on two adjacent cylindrical lenses, T represents the placing heights of the cylindrical lenses, L represents viewing distances of the viewpoint images and n represents the refractive index of the medium from the cylindrical lenses to the pixel surface.

Step 401, browsing images shot from the target screen under the target viewpoints are acquired, wherein the target screen is a screen of which the light emission side is provided with cylindrical lenses.

Figure 10:
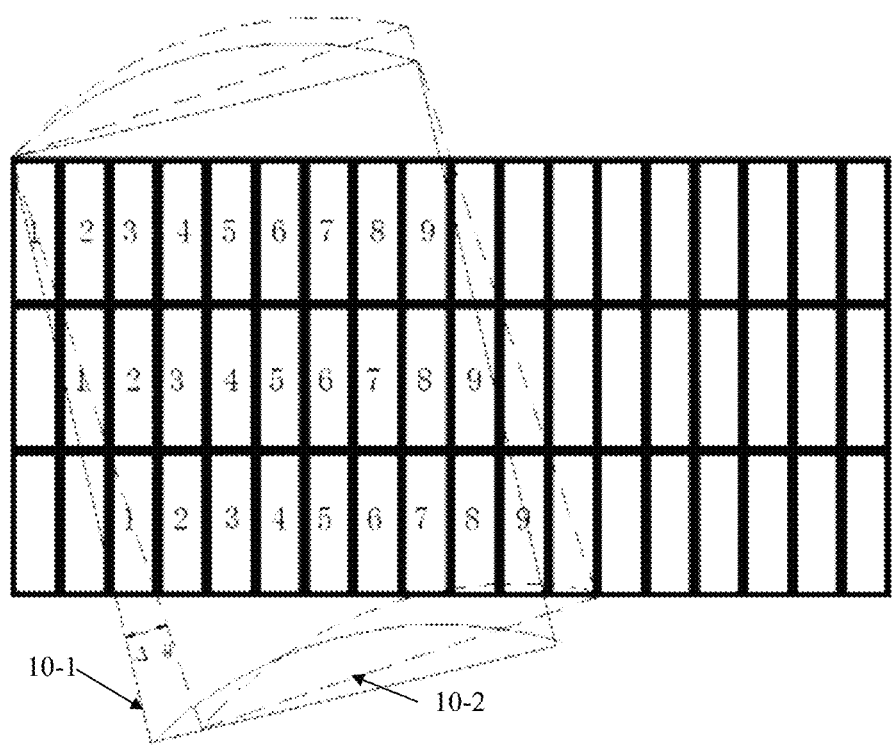
FIG. 10 schematically shows a third schematic diagram of the principle of another screen detection method provided in some embodiments of the present disclosure.

In the embodiments of the present disclosure, the alignment angle deviations of the cylindrical lenses refer to angle deviations of positions where the image contents between the image contents actually displayed by the cylindrical lenses and designed expected image contents are located. Exemplarily, reference is made to FIG. 10, wherein a block body 10-1 is used for reflecting an actual position of an image content, a block body 10-2 is used for reflecting an expected designed position of the image content, and an angle between alignment sidelines between 10-1 and 10-2 is an alignment angle deviation. Browsing images showing different viewing effects may be acquired by adjusting the shooting distance between the image acquisition device and the target screen. It is noteworthy that the contents of the browsing images with the image contents displayed by the target screen under different viewpoints are different, but for a maker of the image contents, viewpoints where a user may clearly view specific contents in the browsing images may be regarded as expected viewing distances meeting an expected demand, but there may be deviations in the detection parameters of the cylindrical lenses, and therefore, there may also be deviations between actual viewing distances generated when an actual user clearly views the specific contents in the browsing images and the expected viewing distances, and then, the actual viewing distances between the shooting viewpoints and the screen when the specific contents may be actually and clearly viewed need to be determined by performing image acquisition on the target screen.

Step 402, the browsing images are used as the viewpoint images under the condition that the longitudinal contents included in the browsing images are at least two target longitudinal contents.

In the embodiments of the present disclosure, the longitudinal contents refer to image contents longitudinally disposed in the browsing images, the target longitudinal contents refer to longitudinal contents which need to be included in the viewpoint images required for participating in this parameter detection, and the target longitudinal contents may be set according to the image contents included in the image contents displayed by the target screen. For example, if the image contents are four figures "1", "2", "3" and "4" disposed in columns, the target longitudinal contents may be set in a manner that the figures included in each column of longitudinally disposed contents are the same, and the browsing images include all the four figures, so that any one viewing distance of the browsing images including the four figures and having the same figure in each column may be used as the actual viewing distances within which the image contents may be clearly viewing distance; conversely, if figures in each column of the browsing images are different, it is proven that the cylindrical lenses have the alignment angle deviations, and therefore, the browsing images including at least two target longitudinal contents may be used as the viewpoint images participating in the parameter detection.

Step 403, the number of the target longitudinal contents, viewpoint positions corresponding to the viewpoint images and pixel point positions on the pixel surface are acquired based on the viewpoint images.

In the embodiments of the present disclosure, the number of the target longitudinal contents may be acquired according to the image contents displayed by the target screen, the viewpoint position and the pixel point positions corresponding to the viewpoint images refer to the detailed description in the step 203, the descriptions thereof are omitted herein.

Step 404, a first pixel point distance between the pixel point positions corresponding to two adjacent viewpoint images on the same cylindrical lens and content widths of the target longitudinal contents on the viewpoint images are acquired.

In the embodiments of the present disclosure, the first pixel point distance may refer to the detailed description in the step 204, the descriptions thereof are omitted herein. The content widths of the target longitudinal contents refer to display widths of the target longitudinal contents in the viewpoint images.

Step 405, the alignment angle deviations of the cylindrical lenses are acquired based on the number of the target longitudinal contents, the first pixel point distance and the content widths.

In the embodiments of the present disclosure, measured by experiments, the alignment angle deviations of the cylindrical lenses are negatively correlated to a ratio of the number of the target longitudinal contents to the content widths and is also negatively correlated to the first pixel point distance, and therefore, the alignment angle deviations of the cylindrical lenses may be acquired by setting an algorithm formula according to the correlation relationships.

Optionally, the step 405 includes the step that the alignment angle deviations of the cylindrical lenses are output according to the following formula:

$$\Delta\theta = \arctan\left(\frac{N \cdot P_{sub}}{W}\right)$$

wherein $\Delta\theta$ represents the alignment angle deviations of the cylindrical lenses, N represents the number of the target longitudinal contents, $P_{sub}$ represents the first pixel point distance between the pixel point positions corresponding to two adjacent viewpoint images on the same cylindrical lens, and W represents the content widths of the target longitudinal contents on the viewpoint images.

Figure 11:
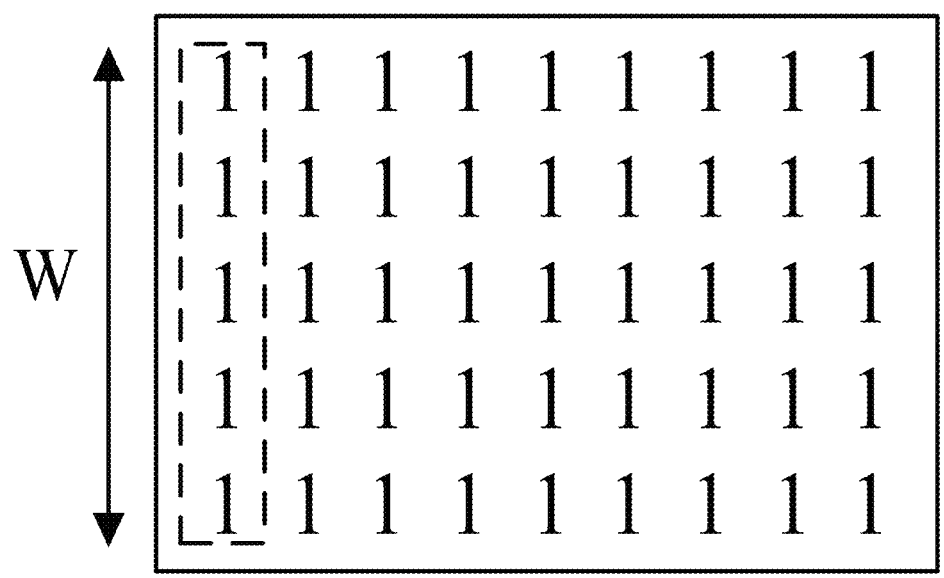
FIG. 11 schematically shows a third schematic diagram of the effect of another screen detection method provided in some embodiments of the present disclosure.

In the embodiments of the present disclosure, if the first pixel point distance $P_{sub}$ is 8.725 µm, and the width W of the target longitudinal content shot in FIG. 11 is measured, when W is 30 mm, the alignment angle deviation AO of the cylindrical lenses may be calculated to be equal to 0.067° by substituting the values into the above-mentioned formula.

Figure 12:
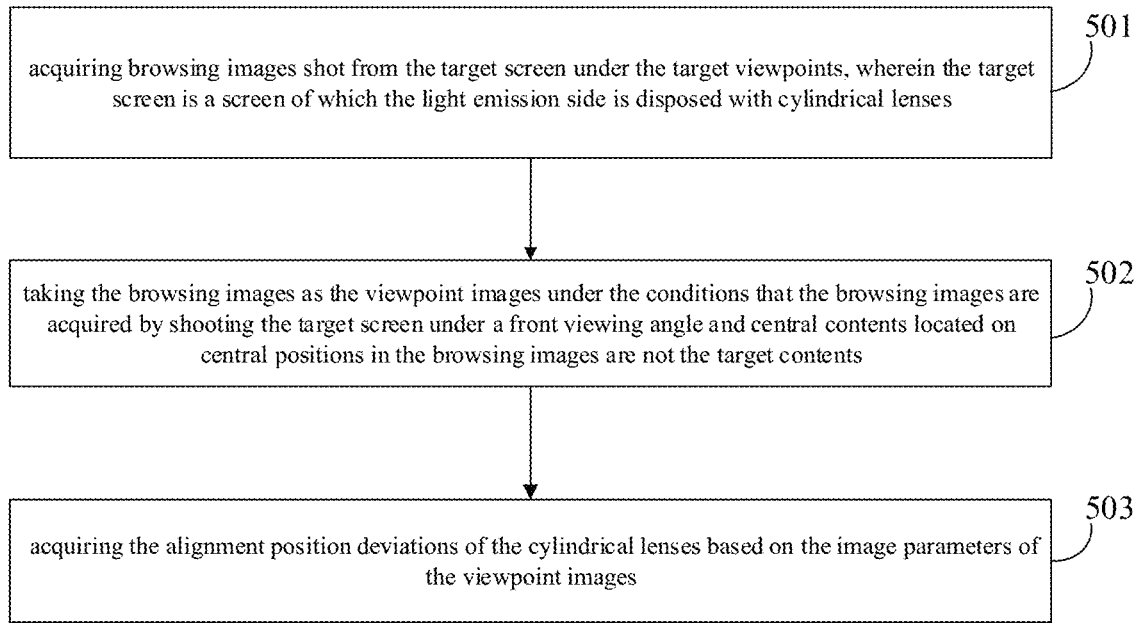
FIG. 12 schematically shows a fourth schematic diagram of the process of another screen detection method provided in some embodiments of the present disclosure.

Optionally, in some embodiments of the present disclosure, the target contents include the detection parameters at least including the alignment angle deviations of the cylindrical lenses. Reference is made to FIG. 12 which shows a fourth schematic diagram of the process of another screen detection method provided by the present disclosure. The method includes:

step 501, browsing images shot from the target screen under the target viewpoints are acquired, wherein the target screen is a screen of which the light emission side is provided with cylindrical lenses.

Figure 13:
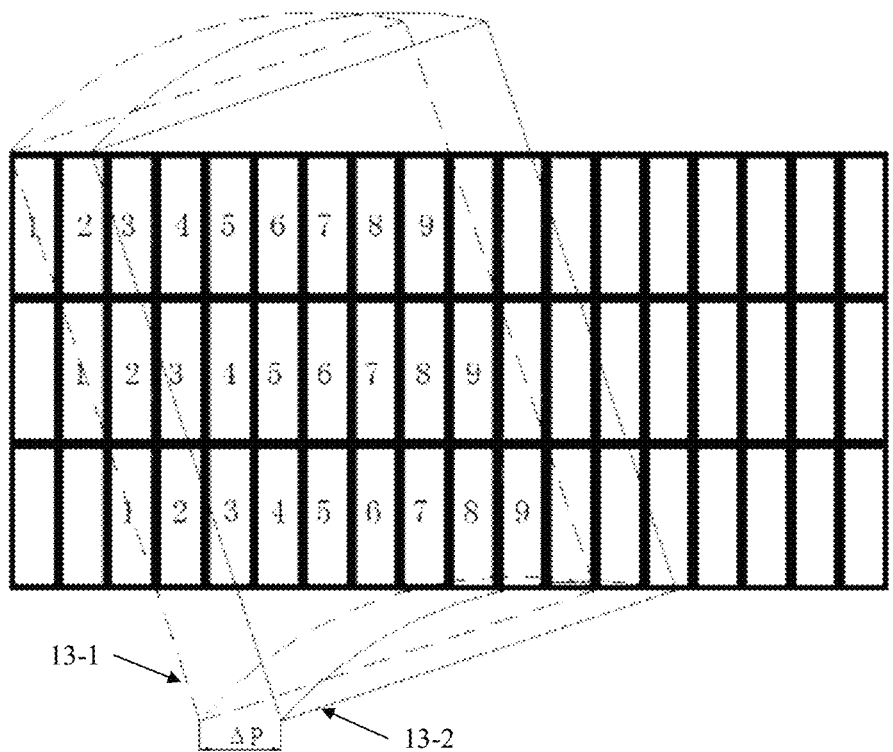
FIG. 13 schematically shows a fourth schematic diagram of the principle of another screen detection method provided in some embodiments of the present disclosure.

In the embodiments of the present disclosure, the alignment angle deviations refer to horizontal distances between positions where the image contents between the image contents actually displayed by the cylindrical lenses and designed expected image contents are located. Exemplarily, reference is made to FIG. 13, wherein a block body 13-1 is used for reflecting an actual position of an image content, a block body 13-2 is used for reflecting an expected designed position of the image content, and a horizontal distance between alignment points between 13-1 and 13-2 is an alignment angle deviation.

Step 502, the browsing images are used as the viewpoint images under the conditions that the browsing images are acquired by shooting the target screen under a front viewing angle and central contents located on central positions in the browsing images are not the target contents.

In the embodiments of the present disclosure, if the central contents located on the central positions in the browsing images are the same to expected designed image contents, it may be affirmed that there are no deviations in alignment positions of the cylindrical lenses of the target screen; and if the image contents in the browsing images shot at the front viewing angle are different from the expected designed image contents, it may be affirmed that there are deviations in alignment positions of the cylindrical lenses of the target screen, parameter detection is needed, and the browsing images are used as the viewpoint images participating in the parameter detection.

Step 503, the alignment position deviations of the cylindrical lenses are acquired based on the image parameters of the viewpoint images.

In the embodiments of the present disclosure, measured by experiments, the alignment position deviations of the cylindrical lenses are positively correlated to difference values of the central contents and the target contents and are negatively correlated to the first pixel point distance, and therefore, the alignment angle deviations of the cylindrical lenses may be calculated by setting an algorithm formula according to the correlation relationships.

Optionally, the step 503 may include the step that the alignment position deviations of the cylindrical lenses are output according to the following formula:

$$\Delta P = M \cdot P_{sub}$$

wherein $\Delta P$ represents the alignment position deviations of the cylindrical lenses, M represents difference values of the acquired central contents and the target contents, and $P_{sub}$ represents the first pixel point distance between the pixel point positions corresponding to two adjacent viewpoint images on the same cylindrical lens.

In the embodiments of the present disclosure, the difference values of the central contents and the target contents refer to index values for representing quality inspection difference degrees of the central contents and the target contents, may be difference values of content types included in the central contents and the target contents or area difference values of difference contents included in the central contents and the target contents and may be specifically set according to actual demands, which is not limited herein. A method for acquiring the first pixel point distance may refer to the detailed description in the step 203, the descriptions thereof are omitted herein.

Exemplarily, if the first pixel point distance $P_{sub}$ is 8.725 µm, the viewpoint images at the front viewing angle are overlapping views between 3 and 4 (if the viewpoint images at the front viewing angle are mainly inclined to 4, 3.7 may be taken), and theory views are overlapping views 2 and 3 (that is, a 2.5 view), the difference value M is equal to 1.2 which is substituted into the above-mentioned formula, and thus, the alignment position deviations $\Delta P$ of the cylindrical lenses may be calculated to be equal to 10.5 µm.

Optionally the step 503 may include the step that the alignment position deviations of the cylindrical lenses are output according to the following formula:

$$\Delta P = \frac{T}{n}|\tan\alpha_1 - \tan_2|$$

wherein $\Delta P$ represents the alignment position deviations of the cylindrical lenses, n represents the refractive index of the medium from the cylindrical lenses to the pixel surface, and $\alpha_1$ and $\alpha_2$ respectively represent two viewing angles adjacent to 0° in distribution of brightness of the viewpoint images relative to the angles of the target viewpoints and respectively used as a first target viewing angle and a second target viewing angle.

Optionally, in some embodiments of the present disclosure, the detection parameters at least include curvature radii of the cylindrical lenses. Reference is made to FIG. 14 which shows a fifth schematic diagram of the process of another screen detection method provided by the present disclosure. The method includes:

step 601, browsing images shot from the target screen under the target viewpoints are acquired, wherein the target screen is a screen of which the light emission side is provided with cylindrical lenses.

In the embodiments of the present disclosure, the curvature radii of the cylindrical lenses refer to rotation rates of tangential direction angles of upper surface center points of the cylindrical lenses relative to upper surface arc lengths. By turning off parts of the image contents displayed by the target screen, parts of the image contents are only displayed, so that display regions where parts of the displayed image contents are turned off in the target screen are black, and thus, the browsing images capable of reflecting the sharpness of the screen may be acquired by shooting the light emission side of the target screen under different viewpoints.

Exemplarily, reference is made to FIG. 15, wherein 15-1 is a browsing image of which parts of displayed image contents are turned off when there are alignment position deviations in the target screen, wherein black stripes are display regions where parts of the displayed image contents which are turned off are located; and 15-2 is a browsing image of which parts of the displayed image contents are turned off when there are no alignment position deviations in the target screen, wherein black stripes are also display regions where parts of the image contents which are turned off are located.

Step 602, the browsing images are used as the viewpoint images under the condition that the sharpness of specified contents in the browsing images is maximum.

In the embodiments of the present disclosure, the sharpness of the browsing images refers to index parameters for representing the display brightness and contrast of an image and may be specifically calculated based on image parameters such as the display brightness or contrast of the image. The sharpness of the specified contents in the browsing images under different shooting viewpoints is different, and therefore, a plurality of acquired browsing images may be compared to select the browsing images with the maximum sharpness as the viewpoint images participating in the parameter detection. For example, when the specified contents are parts of the displayed image contents which are turned off, the browsing images may be screened according to the sharpness of the black stripes in the browsing images; of course, the browsing images may also be screened by comparing the displayed image contents which are not turned off; and relatively speaking, the sharpness of the black stripes is more obvious and may be set according to actual demands so as not to be limited herein.

Step 603, the viewing angles of the viewpoint images are acquired.

In the embodiments of the present disclosure, the shooting angles and the shooting positions of the viewpoint images may be recorded, so that viewing angles of the viewpoint images may be calculated according to the recorded shooting angles and shooting positions.

Step 604, by adjusting curvature radii of optical simulation models of the cylindrical lenses, the curvature radii are used as the curvature radii of the cylindrical lenses when the viewing angles at the maximum sharpness of the optical simulation models are the viewing angles of the viewpoint images.

In the embodiments of the present disclosure, the curvature radii of the cylindrical lenses are correlated to the viewing angles corresponding to the maximum sharpness, that is, the viewing angles at the maximum sharpness of the cylindrical lenses are the same under the condition that the curvature radii are the same. Therefore, the optical simulation models of the cylindrical lenses may be established by virtue of optical simulation software, the viewing angles when the sharpness of the optical simulation models is maximum are observed after the curvature radii of optical simulation models are adjusted, if the viewing angles of the viewpoint images are the same, it is proven that the curvature radii of the cylindrical lenses are the curvature radii of the optical simulation models at the viewing angles.

Figure 17:
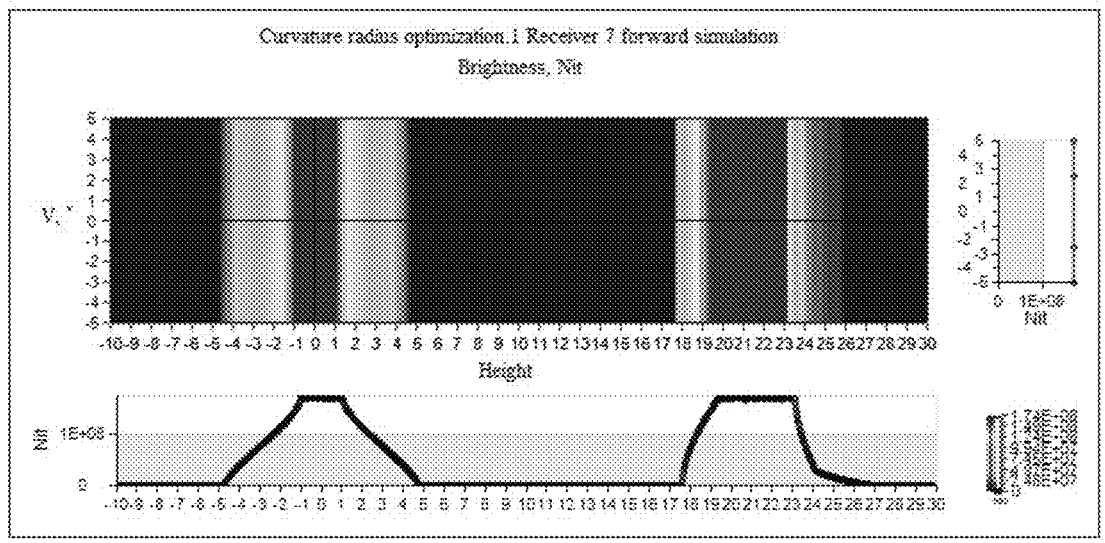
FIG. 17 schematically shows a fifth schematic diagram of the effect of another screen detection method provided in some embodiments of the present disclosure.

Exemplarily, reference is made to FIG. 16, 16-1 is a viewpoint image with relatively little contrast of brightness and darkness at a non-aligned viewing angle (the shooting viewing angle is 0°), 16-2 is a viewpoint image with relatively great contrast of brightness and darkness at an aligned viewing angle (the shooting viewing angle is 21°), and therefore, it is determined that the sharpness of a viewpoint image when the shooting viewing angle is 21° is maximum, and then, the viewing angle 21° where the sharpness is maximum is substituted into the above-mentioned step 204 to process. That is, a result obtained by software simulation is shown as FIG. 17, wherein when pixels obtained when the curvature radii are 62.5 μm, the light emission brightness is highest, the sharpness is maximum, and therefore, the curvature radii r of the cylindrical lenses are 62.5 μm.

Optionally, the sharpness may be acquired by the following step that the sharpness of the viewpoint images is acquired according to negative correlation between the contrasts and sharpness of the viewpoint images.

In the embodiments of the present disclosure, when the sharpness is maximum, the definition of the viewpoint images is highest and most aligned, and therefore, at the moment, the contrasts of the viewpoint images are also maximum, the browsing images with the maximum contrasts may be selected as the viewpoint images from the browsing images, and then, the sharpness of the images is efficiently acquired.

Of course, the sharpness of the viewpoint images may also be calculated in other sharpness acquisition methods, such as a modulation transfer function (MTF) which is used for acquiring the sharpness of the viewpoint images based on image scheduling values, in the related art. Of course, the specific sharpness calculation manner may be set according to actual demands, and any manners capable of representing the sharpness of the viewpoint images may be applicable to the embodiments of the present disclosure and are not limited herein.

Figure 18:
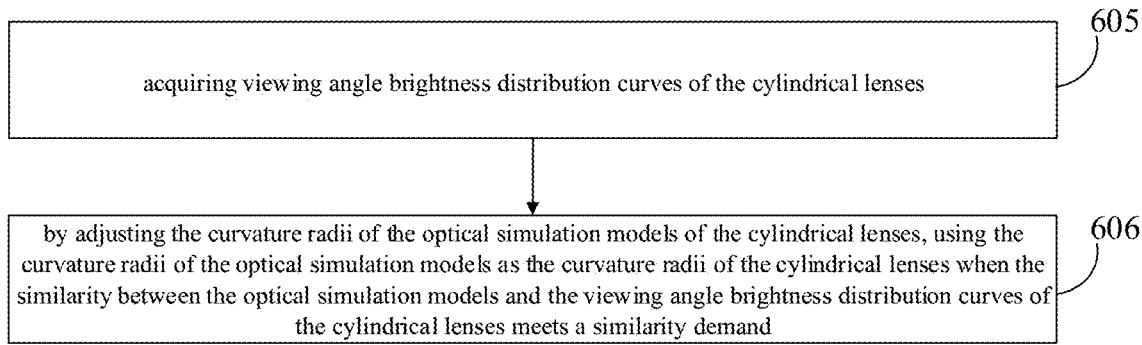
FIG. 18 schematically shows a sixth schematic diagram of the effect of another screen detection method provided in some embodiments of the present disclosure.

Optionally, reference is made to FIG. 18, the curvature radii of the cylindrical lenses may also be output by the following steps from step 605 to step 606:

step 605, viewing angle brightness distribution curves of the cylindrical lenses are acquired.

In the embodiments of the present disclosure, the upper surfaces of the cylindrical lenses may be scanned by virtue of an image acquisition device provided with laser lenses, so that the viewing angle brightness distribution curves of the cylindrical lenses are acquired.

Step 606, by adjusting the curvature radii of the optical simulation models of the cylindrical lenses, the curvature radii of the optical simulation models are used as the curvature radii of the cylindrical lenses when the similarity between the optical simulation models and the viewing angle brightness distribution curves of the cylindrical lenses meets a similarity demand.

In the embodiments of the present disclosure, the viewing angle brightness distribution curves corresponding to all the curvature radii in the optical simulation model are scanned by a system, so that the viewing angle brightness distribution curves corresponding to all the curvature radii are acquired. Then, the similarity between the viewing angle brightness distribution curves corresponding to all the curvature radii and actual viewing angle brightness distribution curves of the cylindrical lenses is calculated; and when the similarity meets the similarity demand, it may be affirmed that the curvature radii are the curvature radii of the cylindrical lenses. The similarity demand may be that the similarity is greater than a similarity threshold or the maximum value of the similarity is taken, which may be specifically set according to actual demands, but is not limited herein.

In the embodiments of the present disclosure, by screening a target body type category of a user from various body type categories according to predicted image features extracted from body images of the user, the body type category of the user may be accurately recognized without depending on a body type template, so that the accuracy of screen detection is improved.

Figure 19:
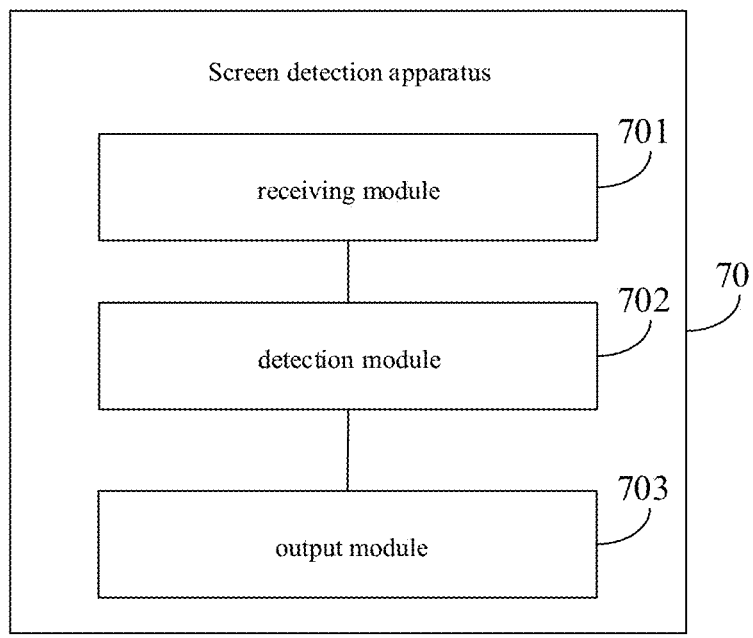
FIG. 19 schematically shows a schematic diagram of a structure of a screen detection apparatus provided in some embodiments of the present disclosure.

FIG. 19 schematically shows a schematic diagram of a structure of a screen detection apparatus 70 provided by the present disclosure. The apparatus includes:

- a receiving module 701 configured to receive a cylindrical lens detection instruction for a target screen, wherein the cylindrical lens detection instruction at least includes target viewpoints;
- a detection module 702 configured to acquire browsing images shot from the target screen under the target viewpoints in response to the detection instruction, wherein the target screen is a screen of which the light emission side is provided with cylindrical lenses;
- the browsing images are used as viewpoint images under the condition that the browsing images include target contents; and
- an output module 703 configured to output detection parameters of the cylindrical lenses on the target screen based on image parameters of the viewpoint images.

Optionally, the detection module 702 is further configured to:

adjust viewpoints of an image acquisition device to the target viewpoints so that the light emission side of the target screen is shot to acquire the browsing images.

Optionally, the detection module 702 is further configured to:

adjust a shooting position of the image acquisition device relative to the target screen to a target position so that the light emission side of the target screen is shot to acquire the browsing images.

Optionally, the detection module 702 is further configured to:

adjust shooting position parameters of the image acquisition device to make the shooting position of the image acquisition device located on the target position, wherein the shooting position parameters include at least one of a shooting angle, a shooting height and a shooting distance.

Optionally, at least two target contents are provided.

Optionally, the detection module 702 is further configured to:

use the browsing images as the viewpoint images under the condition that the browsing images include the target contents, wherein viewpoints of at least two viewpoint images are located on the same straight line, and the straight line is parallel to a pixel surface of the target screen.

Optionally, the image parameters at least include placing heights of the cylindrical lenses.

The output module 703 is further configured to:

acquire viewpoint positions corresponding to the viewpoint images and pixel point positions on the pixel surface based on the viewpoint images;

acquire a first pixel point distance between the pixel point positions corresponding to two adjacent viewpoint images on the same cylindrical lens; and acquire the placing heights of the cylindrical lenses on the target screen based on the viewpoint positions, the number of the viewpoints, the first pixel point distance and a refractive index of a medium from the cylindrical lenses to the pixel surface.

Optionally, the output module 703 is further configured to:

establish space rectangular coordinates (x, y, z) by using a plane where the pixel surface of the target screen is located as an xy plane, acquire spatial coordinate values of the viewpoint positions in the space rectangular coordinates, and output the placing heights of the cylindrical lenses on the target screen according to the following formula:

$$T = \frac{(N-1)nzP_{sub}}{|x_N - x_1|}$$

wherein T represents the placing heights, N represents the number of the viewpoints, n represents the refractive index of the medium from the cylindrical lenses to the pixel surface, $P_{sub}$ represents the first pixel point distance between the pixel point positions corresponding to two adjacent viewpoint images on the same cylindrical lens, $x_N$ represents an x-axis spatial coordinate value of an $N^{th}$ viewpoint image, $x_1$ represents an x-axis coordinate value of a first viewpoint image, and z represents a z-axis coordinate value of each viewpoint image, wherein N≥2 and N is a positive integer.

Optionally, the target contents include target transverse contents.

The detection module 702 is further configured to:

use the browsing images as the viewpoint images under the condition that the transverse contents included in the browsing images are the target transverse contents.

Optionally, the detection parameters at least include a central distance between two adjacent cylindrical lenses.

The output module 703 is further configured to:

acquire the central distance between two adjacent cylindrical lenses based on the placing heights of the cylindrical lenses and the refractive index of the medium from the cylindrical lenses to the pixel surface.

Optionally, the output module 703 is further configured to:

output the central distance between two adjacent cylindrical lenses according to the following formula:

$$P_{lens} = \frac{T}{n}(\tan|\alpha_1| + \tan|\alpha_2|)$$

wherein $P_{lens}$ represents the central distance between two adjacent cylindrical lenses, T represents the placing heights of the cylindrical lenses, n represents the refractive index of the medium from the cylindrical lenses to the pixel surface, and $\alpha_1$ and $\alpha_2$ respectively represent two viewing angles adjacent to 0° in distribution of brightness of the viewpoint images relative to the angles of the target viewpoints and respectively used as a first target viewing angle and a second target viewing angle.

Optionally, the output module 703 is further configured to:

output the central distance between two adjacent cylindrical lenses according to the following formula:

$$P_{lens} = \frac{L \cdot P_{pixel}}{L + T/n}$$

wherein $P_{lens}$ represents the central distance between two adjacent cylindrical lenses, L represents viewing distances of the viewpoint images, pixel represents a second pixel point distance between the pixel point positions corresponding to the viewpoint images on two adjacent cylindrical lenses, T represents the placing heights of the cylindrical lenses, and n represents the refractive index of the medium from the cylindrical lenses to the pixel surface.

Optionally, the target contents include a plurality of target longitudinal contents.

The detection module 702 is further configured to:
use the browsing images as the viewpoint images under the condition that the longitudinal contents included in the browsing images are at least two target longitudinal contents.

Optionally, the detection parameters at least include alignment angle deviations of the cylindrical lenses.

The output module 703 is further configured to:
acquire the number of the target longitudinal contents, viewpoint positions corresponding to the viewpoint images and pixel point positions on the pixel surface based on the viewpoint images;
acquire a first pixel point distance between the pixel point positions corresponding to two adjacent viewpoint images on the same cylindrical lens and content widths of the target longitudinal contents on the viewpoint images; and
acquire the alignment angle deviations of the cylindrical lenses based on the number of the target longitudinal contents, the first pixel point distance and the content widths.

The output module 703 is further configured to:
output the alignment angle deviations of the cylindrical lenses according to the following formula:

$$\Delta\theta = \arctan\left(\frac{N \cdot P_{sub}}{W}\right)$$

wherein $\Delta\theta$ represents the alignment angle deviations of the cylindrical lenses, N represents the number of the target longitudinal contents, $P_{sub}$ represents the first pixel point distance between the pixel point positions corresponding to two adjacent viewpoint images on the same cylindrical lens, and W represents the content widths of the target longitudinal contents on the viewpoint images.

Optionally, the detection module 702 is further configured to:
use the browsing images as the viewpoint images under the conditions that the browsing images are acquired by shooting the target screen under a front viewing angle and central contents located on central positions in the browsing images are not the target contents.

Optionally, the detection parameters at least include alignment position deviations of the cylindrical lenses.

The output module 703 is further configured to:
acquire the alignment position deviations of the cylindrical lenses based on the image parameters of the viewpoint images.

Optionally, the output module 703 is further configured to:
output the alignment position deviations of the cylindrical lenses according to the following formula:

$$\Delta P = M \cdot P_{sub}$$

wherein $\Delta P$ represents the alignment position deviations of the cylindrical lenses, M represents difference values of the acquired central contents and the target contents, and $P_{sub}$ represents the first pixel point distance between the pixel point positions corresponding to two adjacent viewpoint images on the same cylindrical lens.

Optionally, the output module 703 is further configured to:
output the alignment position deviations of the cylindrical lenses according to the following formula:

$$\Delta P = \frac{T}{n}|\tan\alpha_1 - \tan\alpha_2|$$

wherein $\Delta P$ represents the alignment position deviations of the cylindrical lenses, n represents the refractive index of the medium from the cylindrical lenses to the pixel surface, and $\alpha_1$ and $\alpha_2$ respectively represent two viewing angles adjacent to 0° in distribution of brightness of the viewpoint images relative to the angles of the target viewpoints and respectively used as a first target viewing angle and a second target viewing angle.

Optionally, the detection module 702 is further configured to:
use the browsing images as the viewpoint images under the condition that the sharpness of specified contents in the browsing images is maximum.

Optionally, the detection parameters at least include curvature radii of the cylindrical lenses.

The output module 703 is further configured to:
acquire the viewing angles of the viewpoint images; and
by adjusting curvature radii of optical simulation models of the cylindrical lenses, use the curvature radii as the curvature radii of the cylindrical lenses when the viewing angles at the maximum sharpness of the optical simulation models are the viewing angles of the viewpoint images.

Optionally, the detection module 702 is further configured to:
acquire the sharpness of the viewpoint images according to negative correlation between the contrasts and the sharpness of the viewpoint images.

Optionally, the output module 703 is further configured to:
acquire viewing angle brightness distribution curves of the cylindrical lenses; and
by adjusting the curvature radii of the optical simulation models of the cylindrical lenses, use the curvature radii of the optical simulation models as the curvature radii of the cylindrical lenses when the similarity between the optical simulation models and the viewing angle brightness distribution curves of the cylindrical lenses meets a similarity demand.

In the embodiments of the present disclosure, by selecting the viewpoint images including the target contents from the browsing images acquired by shooting the screen under the specific viewpoints, the detection parameters of the cylindrical lenses on the screen are detected according to the image parameters of the viewpoint images, so that all the detection parameters of the cylindrical lenses on the screen can be acquired efficiently and conveniently, and the detection efficiency of the detection parameters of the cylindrical lenses on the screen is increased.

The above-mentioned embodiment of the device is merely schematic, wherein the units described as a separation component may be or not be physically separated, and a component serving as a unit for display may be or not be a physical unit, that is, they may be located on the same place or distributed on a plurality of network units. Parts or all of the modules may be selected according to an actual demand to achieve the purpose of the solution in the present embodiment. The present disclosure can be understood and implemented by those of ordinary skill in the art without creative work.

The embodiments of all the components in the present disclosure may be implemented by virtue of hardware or a software module running on one or more processors or their combinations. It should be understood by the skilled in the art that some or all functions of some or all of the components in a computing processing device according to an embodiment of the present disclosure may be achieved in practice by using a microprocessor or a digital signal processor (DSP). The present disclosure may be further implemented as a part or all of device or apparatus programs (such as a computer program and a computer program product) for performing the method described herein. Such programs for achieving the present disclosure may be stored in a computer readable medium or in a manner that one or more signals are provided. Such signals may be downloaded from a website of the Internet or provided on carrier signals or provided in any other forms.

Figure 20:
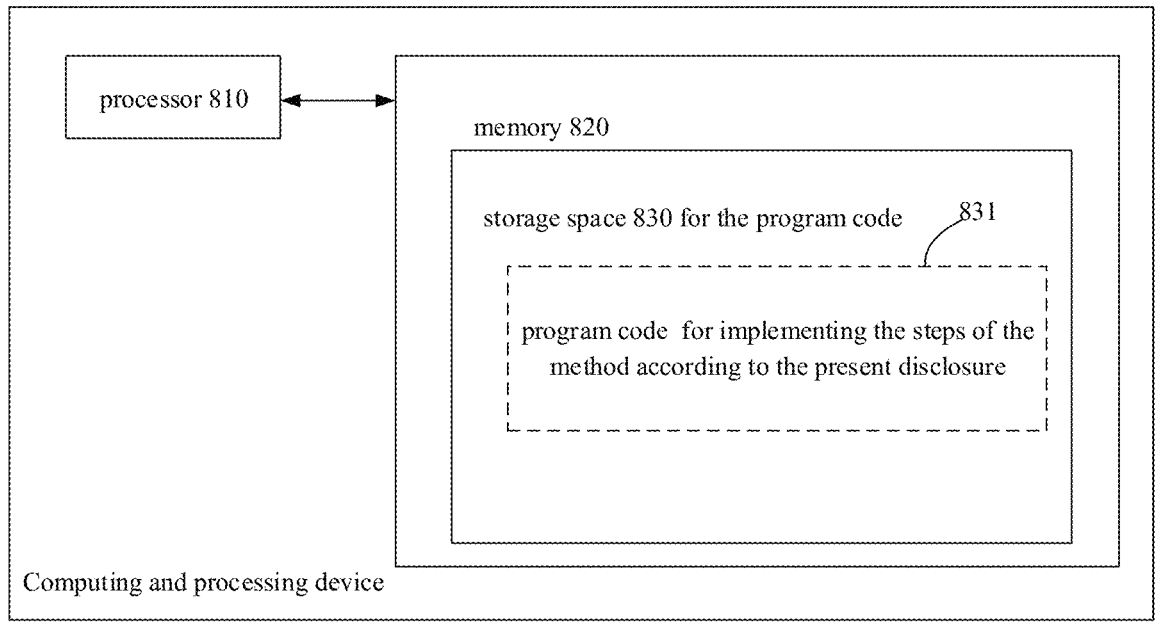
FIG. 20 schematically shows a block diagram of a computing processing device for executing the method according to some embodiments of the present disclosure.
Figure 21:
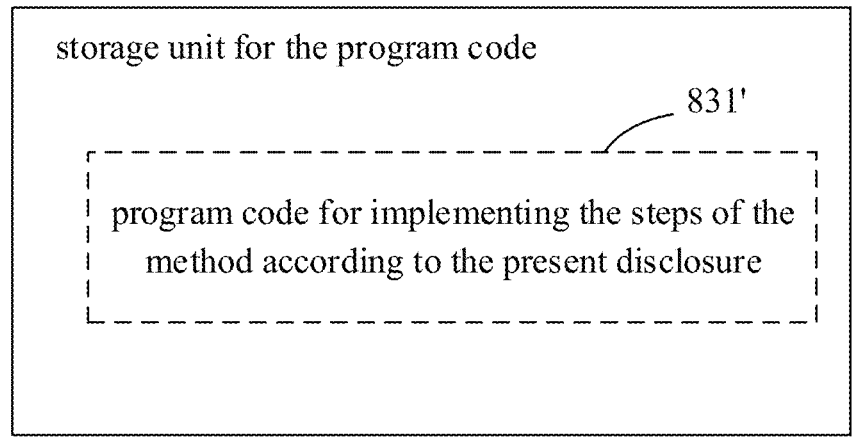
FIG. 21 schematically shows a storage unit for holding or carrying a program code for implementing the method according to some embodiments of the present disclosure.

For example, FIG. 20 shows a computing processing device capable of implementing the method according to the present disclosure. The computing processing device traditionally includes a processor 810 and a computer program product or computer readable medium in a form of a memory 820. The memory 820 may be an electronic memory such as a flash memory, an EEPROM (Electronically Erasable Programmable Read Only Memory), an EPROM, a hard disk or an ROM. The memory 820 is provided with a storage space 830 for program codes 831 for performing any steps of the above-mentioned method. For example, the storage space 830 for the program codes may include all the program codes 831 respectively used for implementing all the steps of the above-mentioned method. These program codes may be read out of one or more computer program products or written into the one or more computer program products. These computer program products include program code carriers such as hard disks, compact discs (CD), memory cards or flexible disks. Such a computer program product is generally a portable or stationary storage unit as shown in FIG. 21. The storage unit may be provided with a storage segment, a storage space and the like disposed like the memory 820 of the computing processing device in FIG. 20. The program codes may be compressed in an appropriate form, for example. Generally, the storage unit includes computer readable codes 831', namely codes which may be read by a processor such as the processor 810, and these codes, when running on the computing processing device, cause the computing processing device to perform all the steps in the method described above.

It should be understood that all the steps in the process diagrams of the accompanying drawings are sequentially displayed according to the indication of arrows, however, these steps are not necessarily performed according to an order indicated by the arrows. Unless explicitly stated herein, these steps are performed without strict order limitation and may be performed in other orders. Moreover, at least one part of steps in the process diagrams of the accompanying drawings may include a plurality of sub-steps or stages, these sub-steps or stages are not necessarily performed at the same moment, but may be performed at different moments, and the sub-steps or stages are not necessarily performed in sequence, but may be performed with at least one part of other steps or sub-steps or stages of other steps by turns or alternately.

So-called "an embodiment", "embodiments" or "one or more embodiments" described herein means that specific features, structures or characteristics described in combination with the embodiment are included in at least one embodiment of the present disclosure. In addition, note that an example of an expression "in an embodiment" described herein does not necessarily refer to the same embodiment.

A great number of concrete details are described in the description provided herein. However, it can be understood that the embodiments of the present disclosure may be put into practice under the condition that these concrete details are not provided. In some embodiments, known methods, structures and technologies are not shown in detail so as not to blur the understanding of the present description.

In claims, any reference symbols located between brackets should not be constructed as limitations on the claims. The word "including" does not exclude elements or steps not listed in the claims. The word "a" or "an" preceding an element does not exclude the presence of a plurality of such elements. The present disclosure may be implemented by virtue of hardware including several different elements and by virtue of a suitably programmed computer. In unit claims listing several apparatuses, several of these apparatuses may be embodied by one and the same item of hardware. The use of words such as first, second and third do not denote any order. These words may be explained as names.

Finally, it should be noted that the above-mentioned embodiments are merely used to describe the technical solutions of the present disclosure, rather than to limit the technical solutions. Although the present disclosure has been described in detail with reference to the above-mentioned embodiments, it should be understood by those of ordinary skill in the art that the technical solutions recorded in all the above-mentioned embodiments may still be modified, or parts of the technical features may be equivalently replaced; and these modifications or replacements do not make the essences of the corresponding technical solutions depart from the spirit and scope of the technical solutions of all the embodiments of the present disclosure.

The invention claimed is:

1. A screen detection method, wherein the method comprises:
  receiving a cylindrical lens detection instruction for a target screen, wherein the cylindrical lens detection instruction at least comprises target viewpoints;
  acquiring browsing images shot from the target screen under the target viewpoints in response to the detection instruction, wherein the target screen is a screen of which a light emission side is provided with cylindrical lenses;
  taking the browsing images as viewpoint images when the browsing images comprise target contents; and
  outputting detection parameters of the cylindrical lenses on the target screen based on image parameters of the viewpoint images, wherein the detection parameters are parameters that are used in detection of the cylindrical lenses and are actual parameters of the cylindrical lenses for replacing design values of the parameters, wherein the detection parameters comprise at least one of placing heights of the cylindrical lenses, a central distance between two adjacent cylindrical lenses, alignment angle deviations of the cylindrical lenses, alignment position deviations of the cylindrical lenses, and curvature radii of the cylindrical lenses;

wherein the detection parameters at least comprise the placing heights of the cylindrical lenses; the step of outputting the detection parameters of the cylindrical lenses on the target screen based on the image parameters of the viewpoint images comprises: acquiring viewpoint positions corresponding to the viewpoint images and pixel point positions on the pixel surface based on the viewpoint images; acquiring a first pixel point distance between the pixel point positions corresponding to two adjacent viewpoint images on the same cylindrical lens; and acquiring the placing heights of the cylindrical lenses on the target screen based on the viewpoint positions, the number of the viewpoints, the first pixel point distance and a refractive index of a medium from the cylindrical lenses to the pixel surface; wherein the step of acquiring the placing heights of the cylindrical lenses on the target screen based on the viewpoint positions, the number of the viewpoints, the first pixel point distance and the refractive index of the medium from the cylindrical lenses to the pixel surface comprises:

establishing space rectangular coordinates (x, y, z) by using a plane where the pixel surface of the target screen is located as an xy plane, acquiring spatial coordinate values of the viewpoint positions in the space rectangular coordinates, and outputting the placing heights of the cylindrical lenses on the target screen according to the following formula:

$$T = \frac{(N-1)nzP_{sub}}{|x_N - x_1|};$$

wherein T represents the placing heights, N represents the number of the viewpoints, n represents the refractive index of the medium from the cylindrical lenses to the pixel surface, $P_{sub}$ represents the first pixel point distance between the pixel point positions corresponding to two adjacent viewpoint images on the same cylindrical lens, $X_N$ represents an x-axis spatial coordinate value of an Nth viewpoint image, $X_1$ represents an x-axis coordinate value of a first viewpoint image, and z represents a z-axis coordinate value of each viewpoint image, wherein N≥2, and N is a positive integer; or wherein the detection parameters at least comprise the central distance between two adjacent cylindrical lenses; the step of outputting the detection parameters of the cylindrical lenses on the target screen based on the image parameters of the viewpoint images comprises: acquiring the central distance between two adjacent cylindrical lenses based on the placing heights of the cylindrical lenses and the refractive index of the medium from the cylindrical lenses to the pixel surface; or;

wherein the detection parameters at least comprise the alignment angle deviations of the cylindrical lenses; wherein the step of outputting the detection parameters of the cylindrical lenses on the target screen based on the image parameters of the viewpoint images comprises: acquiring the number of the target longitudinal contents, viewpoint positions corresponding to the viewpoint images and pixel point positions on the pixel surface based on the viewpoint images; acquiring a first pixel point distance between the pixel point positions corresponding to two adjacent viewpoint images on the same cylindrical lens and content widths of the target longitudinal contents on the viewpoint images; and acquiring alignment angle deviations of the cylindrical lenses based on the number of the target longitudinal contents, the first pixel point distance and the content widths; wherein the step of acquiring the alignment angle deviations of the cylindrical lenses based on the number of the target longitudinal contents, the first pixel point distance and the content widths comprises: outputting the alignment angle deviations of the cylindrical lenses according to the following formula:

$$\Delta\theta = \arctan\left(\frac{N \cdot P_{sub}}{W}\right);$$

wherein Δθ represents the alignment angle deviations of the cylindrical lenses, N represents the number of the target longitudinal contents, $P_{sub}$ represents the first pixel point distance between the pixel point positions corresponding to two adjacent viewpoint images on the same cylindrical lens, and W represents the content widths of the target longitudinal contents on the viewpoint images; or wherein the detection parameters at least comprise the alignment position deviations of the cylindrical lenses; wherein the step of outputting the detection parameters of the cylindrical lenses on the target screen based on the image parameters of the viewpoint images comprises: acquiring the alignment position deviations of the cylindrical lenses based on the image parameters of the viewpoint images; or wherein the detection parameters at least comprise the curvature radii of the cylindrical lenses; wherein the step of outputting the detection parameters of the cylindrical lenses on the target screen based on the image parameters of the viewpoint images comprises: acquiring the viewing angles of the viewpoint images; and by adjusting curvature radii of optical simulation models of the cylindrical lenses, using the curvature radii as the curvature radii of the cylindrical lenses when the viewing angles at the maximum sharpness of the optical simulation models are the viewing angles of the viewpoint images.

2. The method according to claim 1, wherein the step of acquiring the browsing images shot from the target screen under the target viewpoints, wherein the target screen is the screen of which the light emission side is provided with the cylindrical lenses, comprises:

adjusting viewpoints of an image acquisition device to the target viewpoints to shoot the light emission side of the target screen, to acquire the browsing images.

3. The method according to claim 2, wherein the step of adjusting viewpoints of an image acquisition device to the target viewpoints to shoot the light emission side of the target screen, to acquire the browsing images comprises:

adjusting a shooting position of the image acquisition device relative to the target screen to a target position to shoot the light emission side of the target screen, to acquire the browsing images.

4. The method according to claim 3, wherein the step of adjusting a shooting position of the image acquisition device relative to the target screen to a target position comprises:

adjusting shooting position parameters of the image acquisition device to make the shooting position of the image acquisition device located on the target position, wherein the shooting position parameters comprise at least one of a shooting angle, a shooting height and a shooting distance.

5. The method according to claim 1, wherein at least two target contents are provided;
the step of taking the browsing images as the viewpoint images when the browsing images comprise the target contents comprises:
taking the browsing images as the viewpoint images when the browsing images comprise the target contents, wherein viewpoints of at least two viewpoint images are located on a same straight line, and the straight line is parallel to a pixel surface of the target screen.

6. The method according to claim 1, wherein the target contents comprise target transverse contents;
the step of taking the browsing images as the viewpoint images when the browsing images comprise the target contents comprises:
taking the browsing images as the viewpoint images when the transverse contents comprised in the browsing images are the target transverse contents.

7. The method according to claim 1, wherein the step of acquiring the central distance between two adjacent cylindrical lenses based on the placing heights of the cylindrical lenses and the refractive index of the medium from the cylindrical lenses to the pixel surface comprises:
outputting the central distance between two adjacent cylindrical lenses according to the following formula:

$$P_{lens} = \frac{T}{n}(\tan|\alpha_1| + \tan|\alpha_2|);$$

wherein $P_{lens}$ represents the central distance between two adjacent cylindrical lenses, T represents the placing heights of the cylindrical lenses, n represents the refractive index of the medium from the cylindrical lenses to the pixel surface, and $\alpha_1$ and $\alpha_2$ respectively represent two viewing angles adjacent to 0° in distribution of brightness of the viewpoint images relative to the angles of the target viewpoints and respectively used as a first target viewing angle and a second target viewing angle.

8. The method according to claim 1, wherein the step of acquiring the central distance between two adjacent cylindrical lenses based on the placing heights of the cylindrical lenses and the refractive index of the medium from the cylindrical lenses to the pixel surface comprises:
outputting the central distance between two adjacent cylindrical lenses according to the following formula:

$$P_{lens} = \frac{L \cdot P_{pixel}}{L + T/n}$$

wherein $P_{lens}$ represents the central distance between two adjacent cylindrical lenses, L represents viewing distances of the viewpoint images, $P_{pixel}$ represents a second pixel point distance between the pixel point positions corresponding to the viewpoint images on two adjacent cylindrical lenses, T represents the placing heights of the cylindrical lenses, and n represents the refractive index of the medium from the cylindrical lenses to the pixel surface.

9. The method according to claim 1, wherein the target contents comprise a plurality of target longitudinal contents;
the step of taking the browsing images as the viewpoint images when the browsing images comprise the target contents comprises:
taking the browsing images as the viewpoint images when the longitudinal contents comprised in the browsing images are at least two target longitudinal contents, wherein the longitudinal contents refer to image contents longitudinally disposed in the browsing images, and the target longitudinal contents refer to longitudinal contents which need to be included in the viewpoint images required for participating in this parameter detection.

10. The method according to claim 1, wherein the step of taking the browsing images as the viewpoint images when the browsing images comprise the target contents comprises:
taking the browsing images as the viewpoint images under the conditions that the browsing images are acquired by shooting the target screen under a front viewing angle and central contents located on central positions in the browsing images are not the target contents.

11. The method according to claim 1, wherein the step of acquiring the alignment position deviations of the cylindrical lenses based on the image parameters of the viewpoint images comprises:
outputting the alignment position deviations of the cylindrical lenses according to the following formula:

$$\Delta P = M \cdot P_{sub}$$

wherein $\Delta P$ represents the alignment position deviations of the cylindrical lenses, M represents difference values of the acquired central contents and the target contents, and $P_{sub}$ represents the first pixel point distance between the pixel point positions corresponding to two adjacent viewpoint images on the same cylindrical lens;
wherein the step of acquiring the alignment position deviations of the cylindrical lenses based on the image parameters of the viewpoint images comprises:
outputting the alignment position deviations of the cylindrical lenses according to the following formula:

$$\Delta P = \frac{T}{n}|\tan\alpha_1 - \tan_2|$$

wherein $\Delta P$ represents the alignment position deviations of the cylindrical lenses, n represents the refractive index of the medium from the cylindrical lenses to the pixel surface, $\alpha_1$ and $\alpha_2$ respectively represent two viewing angles adjacent to 0° in distribution of brightness of the viewpoint images relative to the angles of the target viewpoints and respectively used as a first target viewing angle and a second target viewing angle.

12. The method according to claim 1, wherein the step of taking the browsing images as the viewpoint images when the browsing images comprise the target contents comprises:
taking the browsing images as the viewpoint images when a sharpness of designated contents in the browsing images is maximum.

13. The method according to claim 12, wherein the step of outputting the detection parameters of the cylindrical lenses on the target screen based on the image parameters of the viewpoint images comprises:
acquiring viewing angle brightness distribution curves of the cylindrical lenses; and
by adjusting the curvature radii of the optical simulation models of the cylindrical lenses, taking the curvature radii of the optical simulation models as the curvature radii of the cylindrical lenses when the similarity between the optical simulation models and the viewing angle brightness distribution curves of the cylindrical lenses meets a similarity demand.

14. A computing processing device, wherein, the computing processing device comprises:
a memory storing a computer readable code; and
one or more processors, wherein when the computer readable code is executed by the one or more processors, the computing processing device executes the screen detection method of claim 1.

15. A non-transitory computer readable medium, wherein the computer readable medium stores a computer program for the screen detection method of claim 1.

\* \* \* \* \*